(12) United States Patent
Sun

(10) Patent No.: US 11,558,500 B2
(45) Date of Patent: Jan. 17, 2023

(54) GESTURE INTERACTION METHOD AND TERMINAL

(71) Applicant: Huawei Technologies Co., Ltd., Shenzhen (CN)

(72) Inventor: Xiaokang Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 17/240,988

(22) Filed: Apr. 26, 2021

(65) Prior Publication Data

US 2021/0250439 A1 Aug. 12, 2021

Related U.S. Application Data

(63) Continuation of application No. PCT/CN2020/090410, filed on May 15, 2020.

(30) Foreign Application Priority Data

May 30, 2019 (CN) .......................... 201910464432.0

(51) Int. Cl.
*H04M 1/72454* (2021.01)
*H04M 1/72469* (2021.01)
(Continued)

(52) U.S. Cl.
CPC ...... *H04M 1/72454* (2021.01); *G06F 3/0488* (2013.01); *H04M 1/72403* (2021.01);
(Continued)

(58) Field of Classification Search
CPC ........ G06F 3/0488; G06F 2203/04105; H04M 1/72469; H04M 1/72403; H04M 2250/22; H04M 1/72454
See application file for complete search history.

(56) References Cited

U.S. PATENT DOCUMENTS

2011/0102345 A1 5/2011 Kim et al.
2015/0103023 A1 4/2015 Iwaki
(Continued)

FOREIGN PATENT DOCUMENTS

CN 101753680 A 6/2010
CN 102687100 A 9/2012
(Continued)

OTHER PUBLICATIONS

Samsung, "SOGI@Samsung Galaxy S7 edge curved screen panel operation", Apr. 8, 2016, URL:https://www.youtube.com/watch?v=DKhgljYc_0c, (54 seconds of video).

*Primary Examiner* — Gerald Johnson
(74) *Attorney, Agent, or Firm* — Leydig, Voit & Mayer, Ltd.

(57) ABSTRACT

Embodiments of this application disclose a gesture interaction method, applied to a terminal configured with a curved screen, where the curved screen includes a main screen region and a side screen region. The method in the embodiments of this application includes: obtaining, by the terminal, a touch operation input from the side screen region; detecting, by the terminal, a pressing force of the touch operation; and performing, by the terminal, a first function corresponding to the touch operation if the pressing force is greater than a preset threshold.

18 Claims, 17 Drawing Sheets

(51) Int. Cl.
*H04M 1/72403* (2021.01)
*G06F 3/0488* (2022.01)

(52) U.S. Cl.
CPC ............ *H04M 1/72469* (2021.01); *G06F 2203/04105* (2013.01); *H04M 2250/22* (2013.01)

(56) References Cited

U.S. PATENT DOCUMENTS

| | | | |
|---|---|---|---|
| 2015/0195356 A1 | 7/2015 | Kim et al. | |
| 2015/0378592 A1* | 12/2015 | Kim | G06F 3/0487 715/765 |
| 2016/0026316 A1 | 1/2016 | Choi et al. | |
| 2016/0357298 A1 | 12/2016 | Kim et al. | |
| 2018/0329605 A1 | 11/2018 | Venkateswararao | |
| 2020/0201501 A1* | 6/2020 | Rho | G06F 1/1643 |

FOREIGN PATENT DOCUMENTS

| | | | |
|---|---|---|---|
| CN | 103105960 A | 5/2013 | |
| CN | 104182164 A | 12/2014 | |
| CN | 104765541 A | 7/2015 | |
| CN | 104866136 A | 8/2015 | |
| CN | 104902095 A | 9/2015 | |
| CN | 105511680 A | 4/2016 | |
| CN | 105955658 A | 9/2016 | |
| CN | 106055145 A | 10/2016 | |
| CN | 106406656 A | 2/2017 | |
| CN | 106775097 A | 5/2017 | |
| CN | 106790935 A | 5/2017 | |
| CN | 106843685 A | 6/2017 | |
| CN | 109391730 A | 2/2019 | |
| CN | 109428969 A | 3/2019 | |
| CN | 109710099 A | 5/2019 | |
| CN | 109782944 A | 5/2019 | |
| CN | 110351424 A | 10/2019 | |
| CN | 106133748 B | 1/2020 | |
| EP | 3441863 A1 * | 2/2019 | G06F 21/36 |

* cited by examiner

GESTURE INTERACTION METHOD AND TERMINAL

CROSS-REFERENCE TO RELATED APPLICATIONS

This application is a continuation of International Application No. PCT/CN2020/090410, filed on May 15, 2020, which claims priority to Chinese Patent 201910464432.0, filed on May 30, 2019. The disclosures of the aforementioned applications are hereby incorporated by reference in their entireties.

TECHNICAL FIELD

This application relates to the terminal field, and in particular, to a gesture interaction method and a terminal.

BACKGROUND

To help a user quickly start some general or frequently used application functions, a mobile phone is often provided with shortcut operations.

In the prior art, common functions, such as volume up/down and power on/off, or screen capturing, screen recording, and voice assistant awakening can be controlled by pressing a corresponding physical key or a combination of keys.

Physical keys are at fixed locations and there are relatively significant differences between physical key layouts of different mobile phones. Therefore, it takes a long time for a user to learn and adapt. In addition, using physical keys requires the user to press at a specific location with a finger to trigger a corresponding function, and therefore operation difficulty is relatively significant.

SUMMARY

Embodiments of this application provide a gesture interaction method applied to a terminal configured with a curved screen, to reduce operation difficulty for a user.

A first aspect of the embodiments of this application provides a gesture interaction method, applied to a terminal configured with a curved screen that includes a main screen region and a side screen region, including: obtaining, by the terminal, a touch operation input from the side screen region; detecting, by the terminal, a pressing force of the touch operation; and performing, by the terminal, a first function corresponding to the touch operation if the pressing force is greater than a preset threshold.

The gesture interaction method provided in the embodiments of this application is applied to the terminal configured with the curved screen. When a user holds the terminal, the terminal obtains the touch operation input from the side screen region and detects the pressing force of the touch operation. When the pressing force exceeds the preset threshold, the terminal can perform the function corresponding to the touch operation input from the side screen region. Because a touch operation can be performed at a wide range of physical locations in the side screen region, the user can touch the side screen region when holding the terminal. Triggering the terminal to perform a corresponding operation by squeezing a screen region with a specific force can effectively reduce operation difficulty for the user.

In a possible implementation of the first aspect, the method further includes: determining, by the terminal, a current application scenario; and determining, by the terminal, the first function based on the application scenario and the touch operation.

According to the gesture interaction method provided in the embodiments of this application, different functions are assigned based on different scenarios to touch operations input from the side screen region. Therefore, pressing locations may mot be limited on the side screen, specific physical keys are not required, and space occupied in a user interface can also be reduced.

In a possible implementation of the first aspect, the method further includes: displaying, by the terminal based on the touch operation, a prompt image of the first function at a location corresponding to the touch operation.

According to the gesture interaction method provided in the embodiments of this application, the prompt image providing visual guidance may be displayed at the location corresponding to the touch operation, to indicate, to the user, a function that may be triggered by operating the side screen.

In a possible implementation of the first aspect, the location corresponding to the touch operation is in the main screen region.

According to the gesture interaction method provided in the embodiments of this application, the touch operation is input from the side screen region, but the prompt image may be in the main screen region, so that a more conspicuous indication can be provided for the user.

In a possible implementation of the first aspect, a size of the prompt image is positively correlated with the pressing force.

According to the gesture interaction method provided in the embodiments of this application, the size of the prompt image is positively correlated with the pressing force, thereby intuitively guiding the user through a press operation, and providing the user with pressing information.

In a possible implementation of the first aspect, the obtaining, by the terminal, a touch operation input from the side screen region includes: obtaining, by the terminal, a first double-sided squeeze operation, where the first double-sided squeeze operation includes a first squeeze operation input from a left side screen region and a second squeeze operation input from a right side screen region.

According to the gesture interaction method provided in the embodiments of this application, the touch operation may include a double-sided squeeze operation to enrich diversity of the gesture interaction method.

In a possible implementation of the first aspect, the detecting, by the terminal, a pressing force of the touch operation includes: detecting, by the terminal, a first pressing force of the first squeeze operation and a second pressing force of the second squeeze operation; and the performing, by the terminal, a first function corresponding to the touch operation if the pressing force is greater than a preset threshold includes: if the first pressing force is greater than a preset first threshold, and the second pressing force is greater than a preset second threshold, performing, by the terminal, a first function corresponding to the double-sided squeeze operation.

According to the gesture interaction method provided in the embodiments of this application, a specific manner for detecting the pressing force of the touch operation by the terminal when the touch operation is a double-sided squeeze operation is provided to enhance feasibility of the solution.

In a possible implementation of the first aspect, the method further includes: obtaining, by the terminal, a second double-sided squeeze operation, where an input time interval between the second double-sided squeeze operation and the first double-sided squeeze operation is less than a first preset duration threshold; and the performing, by the terminal, a first function corresponding to the touch operation if the pressing force is greater than a preset threshold includes: if both a pressing force of the first double-sided squeeze operation and a pressing force of the second double-sided squeeze operation are greater than a preset third threshold, performing, by the terminal, the first function corresponding to the first double-sided squeeze operation and the second double-sided squeeze operation.

According to the gesture interaction method provided in the embodiments of this application, the terminal may obtain a plurality of double-sided squeeze operations, and determine a corresponding first function through the plurality of double-sided squeeze operations, thereby increasing implementation flexibility of the solution.

In a possible implementation of the first aspect, the method further includes: obtaining, by the terminal, a slide operation input from the side screen region, where an input time interval between the slide operation and the touch operation is less than preset duration; and performing, by the terminal, a second function based on the slide operation.

According to the gesture interaction method provided in the embodiments of this application, the terminal may further obtain a slide operation, and implement the second function based on the slide operation, thereby enhancing diversity of the gesture interaction method.

In a possible implementation of the first aspect, the second function is a sub-function of the first function, and the second function is used to adjust a magnitude of the first function.

According to the gesture interaction method provided in the embodiments of this application, the second function implemented by the terminal through the slide operation is used to adjust the magnitude of the first function, so that a function such as volume adjustment can be conveniently implemented.

In a possible implementation of the first aspect, the method further includes: displaying, by the terminal, a prompt image of the second function at a location corresponding to the slide operation.

According to the gesture interaction method provided in the embodiments of this application, the terminal may display the prompt image of the second function at the location corresponding to the slide operation, to indicate, to the user, a function that may be triggered by operating the side screen.

In a possible implementation of the first aspect, the location corresponding to the slide operation is in the main screen region.

According to the gesture interaction method provided in the embodiments of this application, the touch operation is input from the side screen region, but the prompt image may be in the main screen region, so that a more conspicuous indication can be provided for the user.

In a possible implementation of the first aspect, a size of the prompt image is positively correlated with the magnitude.

According to the gesture interaction method provided in the embodiments of this application, the size of the prompt image is positively correlated with the magnitude, thereby intuitively guiding the user through the slide operation, and providing the user with magnitude change information.

In a possible implementation of the first aspect, the obtaining, by the terminal, a touch operation input from the side screen region includes: obtaining, by the terminal, a single-point press input from the side screen region.

According to the gesture interaction method provided in the embodiments of this application, the touch operation may include a single-point press operation to enrich diversity of the gesture interaction method.

In a possible implementation of the first aspect, the second function includes a volume adjustment function, a screen brightness adjustment function, or a skin beauty level adjustment function.

According to the gesture interaction method provided in the embodiments of this application, a plurality of specific forms of the second function are provided to provide a plurality of options for the user, thereby improving implementation diversity of the solution.

A second aspect of the embodiments of this application provides a gesture interaction method applied to a terminal configured with a curved screen that includes a main screen region and a side screen region, including: obtaining, by the terminal, touch point information input from the side screen region, where the side screen region includes a left side screen region and a right side screen region; determining, by the terminal based on the touch point information, whether a holding mode is a left-handed mode or a right-handed mode; and adjusting, by the terminal, an interface layout based on the holding mode.

The gesture interaction method provided in the embodiments of this application is applied to the terminal configured with the curved screen. The terminal obtains the touch point information input from the side screen region, determines the holding mode of a user, and then adjusts the interface layout. This can facilitate one-handed operation by the user.

In a possible implementation of the second aspect, the touch point information includes a quantity of touch points. The determining, by the terminal based on the touch point information, whether a holding mode is a left-handed mode or a right-handed mode includes: if more than one touch point is input from the left side screen region, determining, by the terminal, that the holding mode is the right-handed mode; or if more than one touch point is input from the right side screen region, determining, by the terminal, that the holding mode is the left-handed mode.

According to the gesture interaction method provided in the embodiments of this application, the holding mode of the user may be determined by using the quantities of touch points input from the left side screen region and the right side screen region.

In a possible implementation of the second aspect, the determining, by the terminal, that the holding mode is a right-handed mode includes: if more than one touch point is input from the left side screen region and one touch point is input from the right side screen region, determining, by the terminal, that the holding mode is the right-handed mode; and the determining, by the terminal, that the holding mode is a left-handed mode includes: if more than one touch point is input from the right side screen region and one touch point is input from the left side screen region, determining, by the terminal, that the holding mode is the left-handed mode.

According to the gesture interaction method provided in the embodiments of this application, a specific implementation for determining the holding mode of the user by using the quantities of touch points input from the left side screen region and the right side screen region is provided to improve determining accuracy.

In a possible implementation of the second aspect, the touch point information includes a touch point area, and the method further includes:

obtaining, by the terminal, a touch point area of a first left touch point input from the left side screen region and a touch point area of a first right touch point input from the right side screen region; and if the touch point area of the first left touch point is greater than the touch point area of the first right touch point, determining, by the terminal, that the holding mode is the left-handed mode; or if the touch point area of the first left touch point is less than the touch point area of the first right touch point, determining, by the terminal, that the holding mode is the right-handed mode.

According to the gesture interaction method provided in the embodiments of this application, a solution of determining the holding mode of the user based on the touch point area is provided. When only one touch point is input in both the left side screen region and the right side screen region, the holding mode cannot be determined by using quantities of touch points, but may be determined by using the touch point area.

In a possible implementation of the second aspect, the method further includes: obtaining, by the terminal, a touch operation input from the side screen region; detecting, by the terminal, a pressing force of the touch operation; and if the pressing force is greater than a preset threshold, triggering the terminal to obtain the touch point information input from the side screen region.

According to the gesture interaction method provided in the embodiments of this application, the user may trigger the terminal to perform holding mode detection through the touch operation. This can avoid interface layout change caused by accidental touch.

A third aspect of the embodiments of this application provides a terminal, the terminal has a curved screen, and the curved screen includes a main screen region and a side screen region. The terminal includes: an obtaining unit, configured to obtain a touch operation input from the side screen region; a detection unit, configured to detect a pressing force of the touch operation; and a processing unit, configured to perform a first function corresponding to the touch operation if the pressing force is greater than a preset threshold.

In a possible implementation of the third aspect, the terminal further includes a determining unit, configured to determine a current application scenario, where the determining unit is further configured to determine the first function based on the application scenario and the touch operation.

In a possible implementation of the third aspect, the terminal further includes a display unit, configured to display, based on the touch operation, a prompt image of the first function at a location corresponding to the touch operation.

In a possible implementation of the third aspect, the obtaining unit is specifically configured to obtain a first double-sided squeeze operation, where the first double-sided squeeze operation includes a first squeeze operation input from a left side screen region and a second squeeze operation input from a right side screen region.

In a possible implementation of the third aspect, the detection unit is specifically configured to detect a first pressing force of the first squeeze operation and a second pressing force of the second squeeze operation; and the processing unit is specifically configured to: if the first pressing force is greater than a preset first threshold, and the second pressing force is greater than a preset second threshold, perform a first function corresponding to the double-sided squeeze operation.

In a possible implementation of the third aspect, the obtaining unit is further configured to obtain a second double-sided squeeze operation, where an input time interval between the second double-sided squeeze operation and the first double-sided squeeze operation is less than a first preset duration threshold; and the processing unit is specifically configured to: if both a pressing force of the first double-sided squeeze operation and a pressing force of the second double-sided squeeze operation are greater than a preset third threshold, perform the first function corresponding to the first double-sided squeeze operation and the second double-sided squeeze operation.

In a possible implementation of the third aspect, the obtaining unit is further configured to obtain a slide operation input from the side screen region, where an input time interval between the slide operation and the touch operation is less than preset duration; and the processing unit is further configured to perform a second function based on the slide operation.

In a possible implementation of the third aspect, the display unit is further configured to display a prompt image of the second function at a location corresponding to the slide operation.

A fourth aspect of the embodiments of this application provides a terminal, the terminal has a curved screen, and the curved screen includes a main screen region and a side screen region. The terminal includes: an obtaining unit, configured to obtain touch point information input from the side screen region, where the side screen region includes a left side screen region and a right side screen region; a determining unit, configured to determine, based on the touch point information, whether a holding mode is a left-handed mode or a right-handed mode; and a processing unit, configured to adjust an interface layout based on the holding mode.

In a possible implementation of the fourth aspect, the touch point information includes a quantity of touch points. The determining unit is specifically configured to: if more than one touch point is input from the left side screen region, determine that the holding mode is the right-handed mode; or if more than one touch point is input from the right side screen region, determine that the holding mode is the left-handed mode.

In a possible implementation of the fourth aspect, the determining unit is specifically configured to: if more than one touch point is input from the left side screen region and one touch point is input from the right side screen region, determine that the holding mode is the right-handed mode; or if more than one touch point is input from the right side screen region and one touch point is input from the left side screen region, determine that the holding mode is the left-handed mode.

In a possible implementation of the fourth aspect, the touch point information includes a touch point area. The obtaining unit is further configured to obtain a touch point area of a first left touch point input from the left side screen region and a touch point area of a first right touch point input from the right side screen region; and the determining unit is specifically configured to: if the touch point area of the first left touch point is greater than the touch point area of the first right touch point, determine that the holding mode is the left-handed mode; or if the touch point area of the first left touch point is less than the touch point area of the first right touch point, determine that the holding mode is the right-handed mode.

In a possible implementation of the fourth aspect, the obtaining unit is further configured to obtain a touch operation input from the side screen region; the terminal further includes a detection unit, configured to detect a pressing force of the touch operation; and the processing unit is further configured to: if the pressing force is greater than a preset threshold, trigger the terminal to obtain the touch point information input from the side screen region.

A fifth aspect of the embodiments of this application provides a terminal, including a processor and a memory. The memory is configured to store an instruction. The processor is configured to perform the steps in the implementations of the first aspect and the second aspect of the foregoing embodiments of this application according to the instruction.

A sixth aspect of the embodiments of this application provides a computer program product including an instruction, and when the computer program product runs on a computer, the computer is enabled to perform the steps in the implementations of the first aspect and the second aspect of the foregoing embodiments of this application according to the instruction.

A seventh aspect of the embodiments of this application provides a computer-readable storage medium including an instruction, and when the instruction runs on a computer, the computer is enabled to perform the steps in the implementations of the first aspect and the second aspect of the foregoing embodiments of this application according to the instruction.

It can be learned from the foregoing technical solutions that the embodiments of this application have the following advantages.

The gesture interaction method provided in the embodiments of this application is applied to the terminal configured with the curved screen. The terminal obtains the touch operation input from the side screen region and detects the pressing force of the touch operation. When the pressing force exceeds the preset threshold, the terminal can perform the function corresponding to the touch operation input from the side screen region. Because a touch operation can be performed at a wide range of physical locations on the side screen, the user can touch the side screen region when holding the terminal. Triggering the terminal to perform a corresponding operation by squeezing the screen with a specific force can effectively reduce operation difficulty for the user.

BRIEF DESCRIPTION OF DRAWINGS

FIG. 5-1 is a schematic diagram of an embodiment of displaying a prompt image by a terminal;

FIG. 5-2 is a schematic diagram of another embodiment of displaying a prompt image by a terminal;

FIG. 9-1 is a schematic diagram of a double-sided squeeze operation;

FIG. 9-2 is another schematic diagram of a double-sided squeeze operation;

DESCRIPTION OF EMBODIMENTS

The embodiments of this application provide a gesture interaction method applied to a terminal configured with a curved screen, to implement interaction by detecting a gesture input from a side screen region of a curved screen, thereby reducing operation difficulty for a user.

The following clearly describes the technical solutions in the embodiments of this application with reference to the accompanying drawings in the embodiments of this application. It is clear that the described embodiments are merely some but not all of the embodiments of this application.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, product, or device.

During a process of using a terminal by a user, there are usually some frequently used or more general functions, such as power on/off, volume up/down, screen capturing, and screen recording. To enable the user to quickly activate these functions, the terminal provides some quick operation methods by using physical keys on sides. For a single-level control function, a corresponding function, such as volume up/down, or power on/off may be directly implemented by pressing a corresponding physical key. In addition, control may be implemented by using a combination of keys. For example, a function such as screen capturing is implemented by using a combination of a volume down key and a power on/off key.

There are relatively significant differences between physical key layouts of different mobile phones, and therefore it takes a long time for the user to learn and adapt when changing a mobile phone. Moreover, physical keys are at fixed locations, the user needs to press at a specific location with a finger to trigger a corresponding function, and therefore operation difficulty is relatively significant.

The embodiments of this application provide a gesture interaction method applied to a terminal configured with a curved screen, to implement interaction by detecting a gesture input from a side screen region of a curved screen, thereby reducing operation difficulty for a user.

Figure 1:
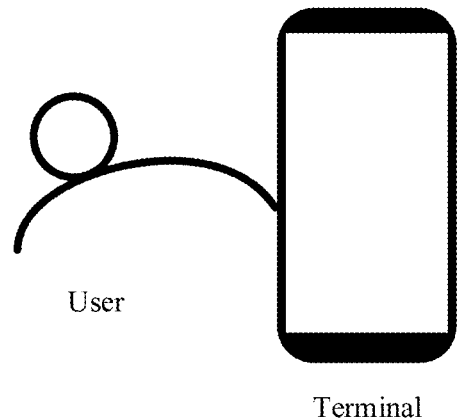
FIG. 1 is a schematic diagram of an architecture of a system through which a user interacts with a terminal.

The following first describes an architecture of a system of a gesture interaction method according to an embodiment of this application. FIG. 1 is a schematic diagram of an architecture of a system through which a user interacts with a terminal.

The terminal may include various handheld devices, vehicle-mounted devices, wearable devices, computing devices, and the like. This embodiment of this application does not specifically limit a specific type of the terminal. The terminal in this embodiment of this application is described by using a mobile phone as an example.

The terminal used in this embodiment of this application is a terminal configured with a curved screen, and the user can interact with the terminal by using the curved screen. The curved screen includes a main screen region and a side screen region. There is a specific physical angle between the side screen region and the main screen region. Optionally, the included angle between the side screen region and the main screen region is close to or exceeds 90 degrees. This application does not limit the included angle between the main screen region and the side screen region to a specific value. It can be understood that generally, when holding the terminal, the user can directly touch the side screen region.

Figure 2:
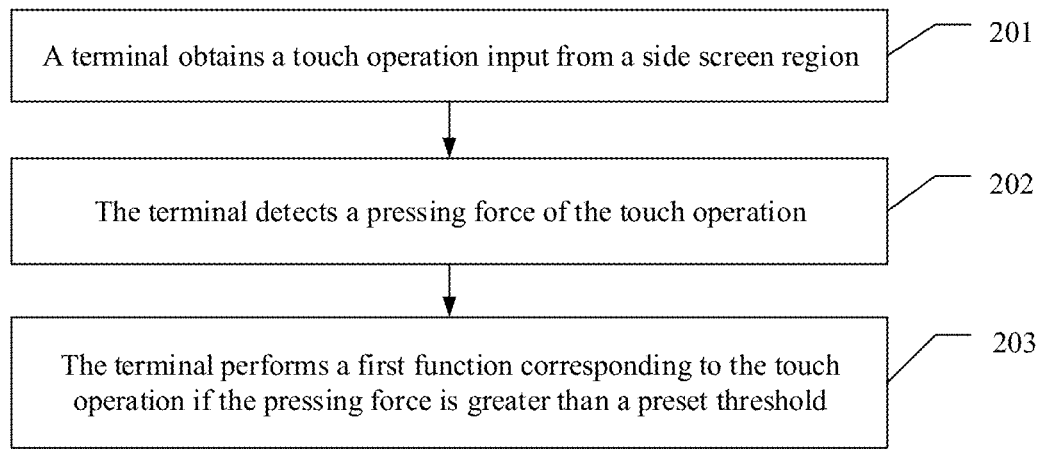
FIG. 2 is a schematic diagram of an embodiment of a gesture interaction method according to an embodiment of this application.

Based on the system architecture in FIG. 1, FIG. 2 is a schematic diagram of an embodiment of a gesture interaction method according to an embodiment of this application.

201. The terminal obtains a touch operation input from the side screen region.

The user may input the touch operation through the side screen region. The touch operation may be implemented in various forms, for example, performing a tap, a one-finger press, a double-sided squeeze, or a slide operation on the side screen region. This is not limited herein.

Optionally, the terminal may further obtain information related to the touch operation, such as a touch location, touch duration, and a touch area. This is not specifically limited herein.

Optionally, the side screen region of the curved screen may include a left side screen region and a right side screen region. The touch operation may be input from the left side screen region or the right side screen region. This is not limited herein. Similarly, if the curved screen configured on the terminal has a plurality of side screen regions, a touch operation may be obtained from each of the plurality of side screen regions, such as an upper side screen region or a lower side screen region.

202. The terminal detects a pressing force of the touch operation.

The terminal may detect the pressing force of the touch operation by using a pressure sensor or the like. A pressure sensor is integrated into a side screen of the terminal, and the pressure sensor of the side screen can monitor a specific pressure value for the terminal to determine a pressure threshold. A common pressure-sensitive touch technology may be implemented by using a chip technology or pressure membrane technology. This is not limited in this embodiment of this application.

203. The terminal performs a first function corresponding to the touch operation if the pressing force is greater than a preset threshold.

The terminal performs the first function corresponding to the touch operation if the pressing force is greater than the preset threshold. Optionally, the preset threshold may be a default threshold of a system of the terminal, or may be a threshold preset on the terminal by the user. This is not limited herein. Optionally, the terminal may preset a threshold range of the pressing force, and performs the first function if the pressing force falls within the threshold range.

Optionally, a correspondence between the touch operation and the first function may be determined in a plurality of ways. For example, the correspondence may be a factory default of the terminal, or user-defined, or determined by the terminal based on a current application scenario. This is not specifically limited herein.

Optionally, the first function may be a function such as photo shooting, volume control, call answering, screen capturing, screen recording, a voice assistant, or payment. It can be understood that the user may customize a frequently used or general function based on a usage habit.

For example, a single-point squeeze operation input in the left side screen region corresponds to the voice assistant, a single-point squeeze operation input in the right side screen region corresponds to call answering, and a double-sided squeeze operation input in the both screen regions corresponds to screen recording. Optionally, an operation type of the touch operation determines a corresponding first function. Therefore, the terminal does not need to determine a corresponding first function based on a specific touch location. In this way, the touch operation of the user is relatively flexible, and operation difficulty for the user can be reduced.

Figure 3:
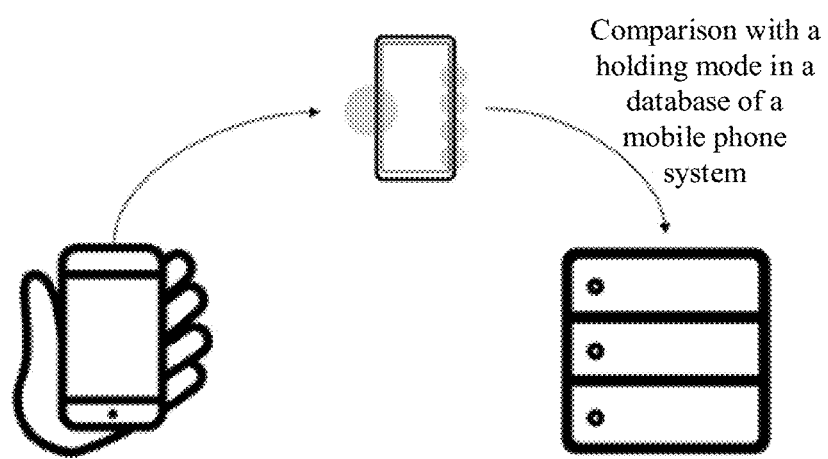
FIG. 3 is a schematic diagram of performing gesture interaction by a user through a side screen region of a terminal.

FIG. 3 is a schematic diagram of performing gesture interaction by a user through a side screen region of a terminal.

The user holds the terminal and performs a touch operation on the side screen region. The terminal detects that pressure exceeds a preset threshold, and performs a function corresponding to the touch operation. Holding and pressing actions are instinctive actions of human hands. Matching these learning-free actions with corresponding control functions can ensure more natural and smooth interaction experience.

The gesture interaction method provided in the embodiments of this application is applied to the terminal configured with the curved screen. The terminal obtains the touch operation input from the side screen and detects the pressing force of the touch operation. When the pressing force exceeds the preset threshold, the terminal can perform the function corresponding to the touch operation input from the side screen. Because a touch operation can be performed at a wide range of physical locations on the side screen, the user can touch the side screen when holding the terminal. Triggering the terminal to perform a corresponding operation by squeezing the screen with a specific force can effectively reduce operation difficulty for the user.

Figure 4:
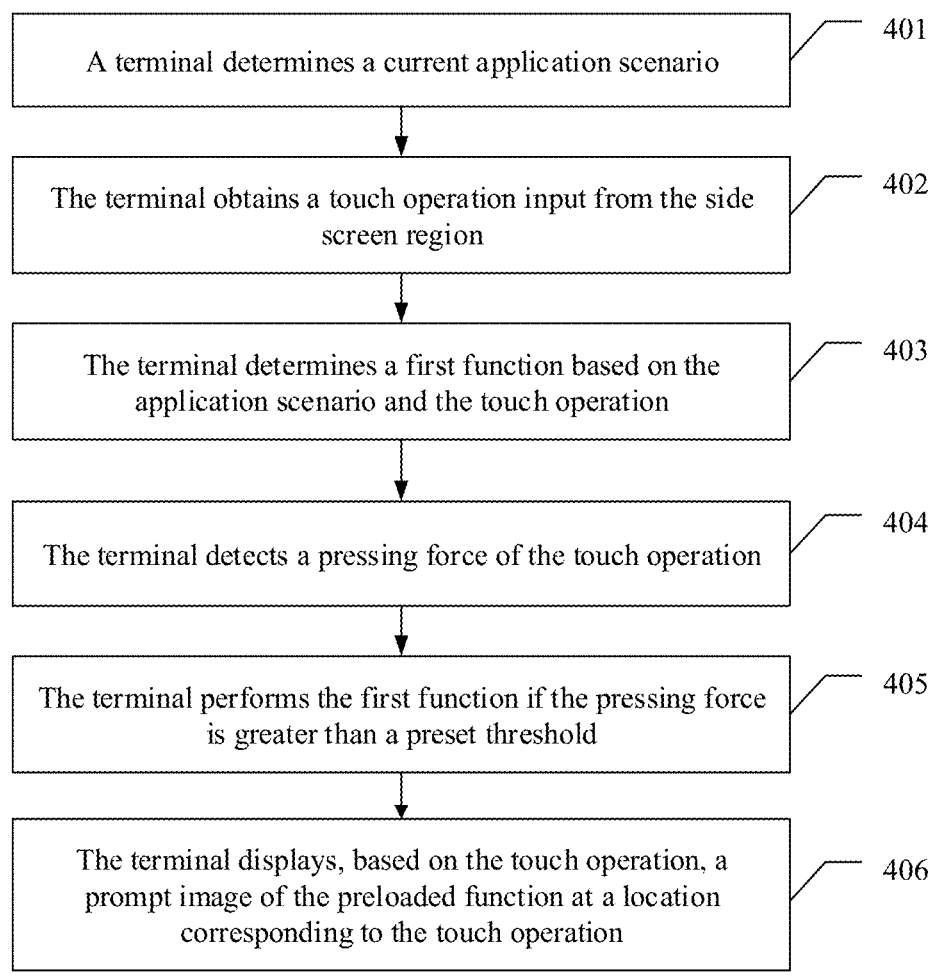
FIG. 4 is a schematic diagram of another embodiment of a gesture interaction method according to an embodiment of this application.

Based on the system architecture in FIG. 1, FIG. 4 is a schematic diagram of another embodiment of a gesture interaction method according to an embodiment of this application. This embodiment describes a gesture interaction method through which a terminal determines a first function with reference to an application scenario and a touch operation. The following steps are included.

401. The terminal determines a current application scenario.

The terminal may determine the current application scenario, and application scenarios may be categorized into different types. From a perspective of a profile used by the terminal, the application scenarios may include, for example, a flight mode, a conference mode, an outdoor mode, and a silent mode; from a perspective of an application type of the terminal, the application scenarios may include, for example, conversational application, video application, and music application; from a perspective of a sub-function scenario within an application of the terminal, the application scenarios may include, for example, a single-player mode and a battle mode in a game application, and a normal mode and a high-definition mode in a video application. Specific types and categorization manners of the application scenarios are not limited herein.

For example, the terminal determines that the current application scenario is a camera by using a program running in the foreground.

402. The terminal obtains a touch operation input from the side screen region.

The user may input the touch operation through the side screen region. The touch operation may be implemented in various forms, including the following type of operation: a tap, a one-finger press, a double-sided squeeze, or a slide operation performed on the side screen region. This is not limited herein.

Optionally, the terminal may further obtain information related to the touch operation, such as a touch location, touch duration, and a touch area. This is not specifically limited herein.

Optionally, the side screen region of the curved screen may include a left side screen region and a right side screen region. The touch operation may be input from the left side screen region or the right side screen region. This is not limited herein. Similarly, if the curved screen configured on the terminal has a plurality of side screen regions, a touch operation may be obtained from each of the plurality of side screen regions, such as an upper side screen region or a lower side screen region.

It should be noted that an execution order of step 402 and step 401 is not limited. Step 401 may be performed before step 402, or step 402 may be performed before step 401.

403. The terminal determines a first function based on the application scenario and the touch operation.

The terminal determines the corresponding first function based on the application scenario obtained in step 401 and the touch operation obtained in step 402. A correspondence between the application scenario and the touch operation, and the first function may be a factory default setting of the terminal or a user-defined setting. This is not specifically limited herein. The correspondence between the application scenario and the touch operation, and the first function may be stored in a system database.

For example, the terminal learns that the current application scenario is a camera application, and the terminal determines, based on a preset correspondence, that a first function corresponding to a touch gesture is photo shooting in the application scenario. Similarly, the terminal learns that the current application scenario is an incoming call state, and a corresponding first function may be call answering. If the terminal learns that a program running in the foreground is a recorder, a corresponding first function may be starting or ending recording. If the terminal learns that a program running in the foreground is a mail program, a corresponding first function may be mail sending.

Optionally, the terminal determines the corresponding first function based on the application scenario and an operation type of the touch operation instead of a specific touch location. In this way, the touch operation of the user is relatively flexible, and operation difficulty for the user can be reduced.

404. The terminal detects a pressing force of the touch operation.

The terminal may detect the pressing force of the touch operation by using a pressure sensor. A pressure sensor is integrated into a side screen of the terminal, and the pressure sensor of the side screen can monitor a specific pressure value for the terminal to determine a pressure threshold. A common force touch technology may be implemented by using a chip technology or pressure membrane technology. This is not limited in this embodiment of this application.

It should be noted that an execution order of step 404 and step 403 is not limited. Step 403 may be performed before step 404, or step 404 may be performed before step 403.

405. The terminal performs the first function if the pressing force is greater than a preset threshold.

The terminal performs the first function corresponding to the touch operation if the pressing force is greater than the preset threshold. Optionally, the preset threshold may be a default threshold of a system of the terminal, or may be preset on the terminal by the user. This is not limited herein. Optionally, the terminal may preset a threshold range of the pressing force, and performs the first function if the pressing force falls within the threshold range.

Optionally, a correspondence between the touch operation and the first function may be determined in a plurality of ways. For example, the correspondence may be a factory default of the terminal, or user-defined, or determined by the terminal based on a current application scenario. This is not specifically limited herein.

Optionally, the first function may be a function such as photo shooting, volume control, call answering, screen capturing, screen recording, a voice assistant, or payment. It can be understood that the user may customize a frequently used or general function based on a usage habit.

406. The terminal displays, based on the touch operation, a prompt image of the preloaded function at a location corresponding to the touch operation.

In the gesture interaction method provided in this embodiment, the first function is performed through the touch operation input from the side screen region, lacking a physical key or visual guidance of a control interface. For ease of determining, by the user, a specific function triggered by pressing the side screen, the prompt image may be displayed at the location corresponding to the touch operation to indicate, to the user, a function that may be triggered by the touch operation input from the side screen region.

Optionally, the location corresponding to the touch operation may be in the side screen region or the main screen region, or extend from the side screen region to the main screen region. This is not limited herein.

Optionally, the prompt image may be a text, an icon, a combination of a text and an icon, or the like, or the prompt image may include various forms of display effects or animations. Optionally, a size of the prompt image may be positively correlated with the pressing force of the touch operation.

It should be noted that step 406 is an optional step, and may or may not be performed. This is not limited herein.

Figures 1, 5:
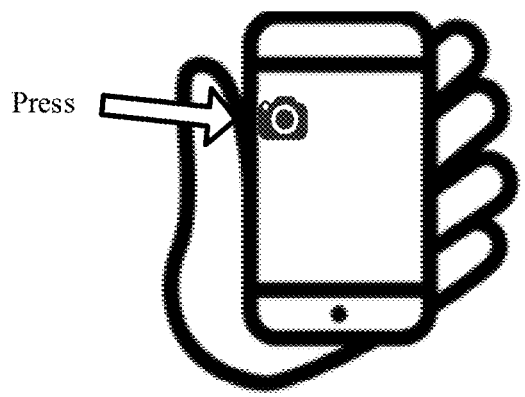
Figures 2, 5:
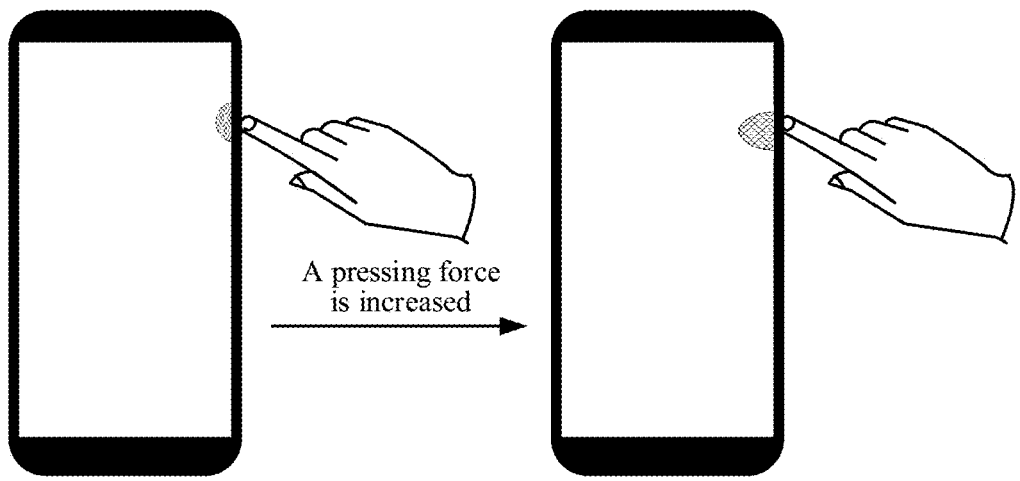

FIG. 5-1 and FIG. 5-2 are schematic diagrams of embodiments of displaying a prompt image by a terminal.

In FIG. 5-1, the user holds the terminal with the left hand and inputs the touch operation with the thumb on the left side screen region to perform a photo shooting function. The terminal displays a visual prompt image, specifically a photo shooting icon, at the location corresponding to the touch operation on a left side of the main screen region.

In an operating process of the user, the pressing force constantly changes, and the size of the prompt image may be positively correlated with the pressing force. Referring to FIG. 5-2, the pressing force of the touch operation increases with a pressing action of a user's finger, and a size of the visual prompt may increase with the pressing force, to visually indicate, to the user, that a shutter has been pressed.

Figure 6:
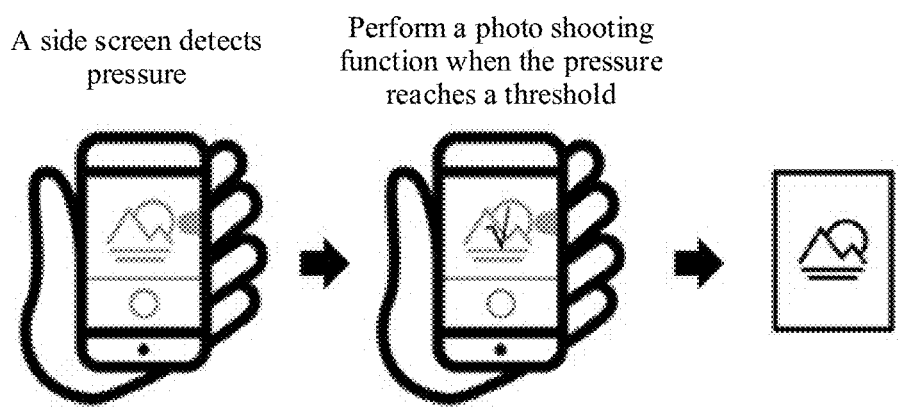
FIG. 6 is a schematic diagram of performing gesture interaction by a user through a side screen region of a terminal.
Figure 7:
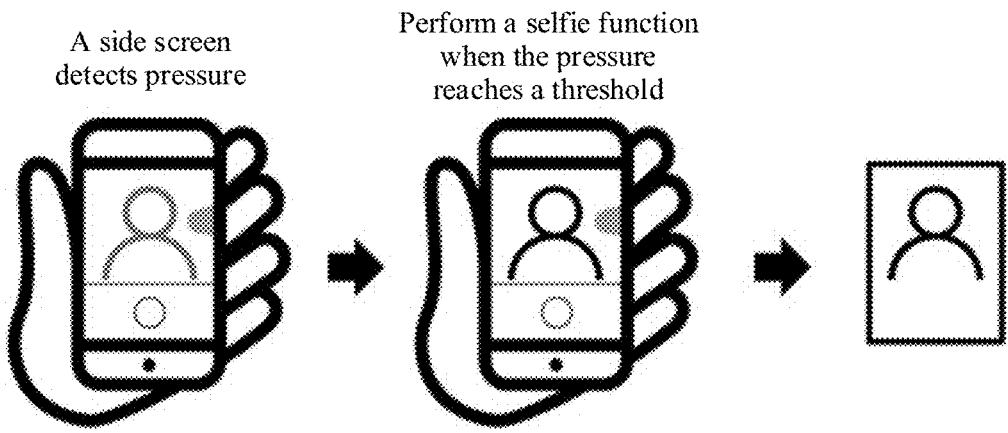
FIG. 7 is another schematic diagram of performing gesture interaction by a user through a side screen region of a terminal.

A camera application scenario is used as an example below to describe the gesture interaction method of this embodiment with reference to FIG. 6 and FIG. 7. FIG. 6 and FIG. 7 are schematic diagrams of performing gesture interaction by a user through a side screen region of a terminal.

In FIG. 6, the terminal learns that the current application scenario is a photo mode, and further obtains a single-sided press operation input from the side screen region by the user. The single-sided press operation in the selfie mode is to perform a photo shooting function of a front-facing camera. When the terminal detects that single-sided pressing pressure reaches a preset threshold, the photo shooting function is performed to obtain a selfie image. In addition, during the touch operation, the terminal displays a prompt image at a location corresponding to the single-sided press in the main screen region, to indicate, to the user, that the photo shooting function has been performed.

In FIG. 7, the terminal learns that the current application scenario is a selfie mode, and further obtains a single-sided press operation input from the side screen region by the user. The single-sided press operation in the photo mode is to perform a photo shooting function of a rear-facing camera. When the terminal detects that single-sided pressing pressure reaches a preset threshold, the photo shooting function is performed to obtain a shot image. In addition, during the touch operation, the terminal displays a prompt image at a location corresponding to the single-sided press in the main screen region, to indicate, to the user, that the photo shooting function has been performed.

Figure 8:
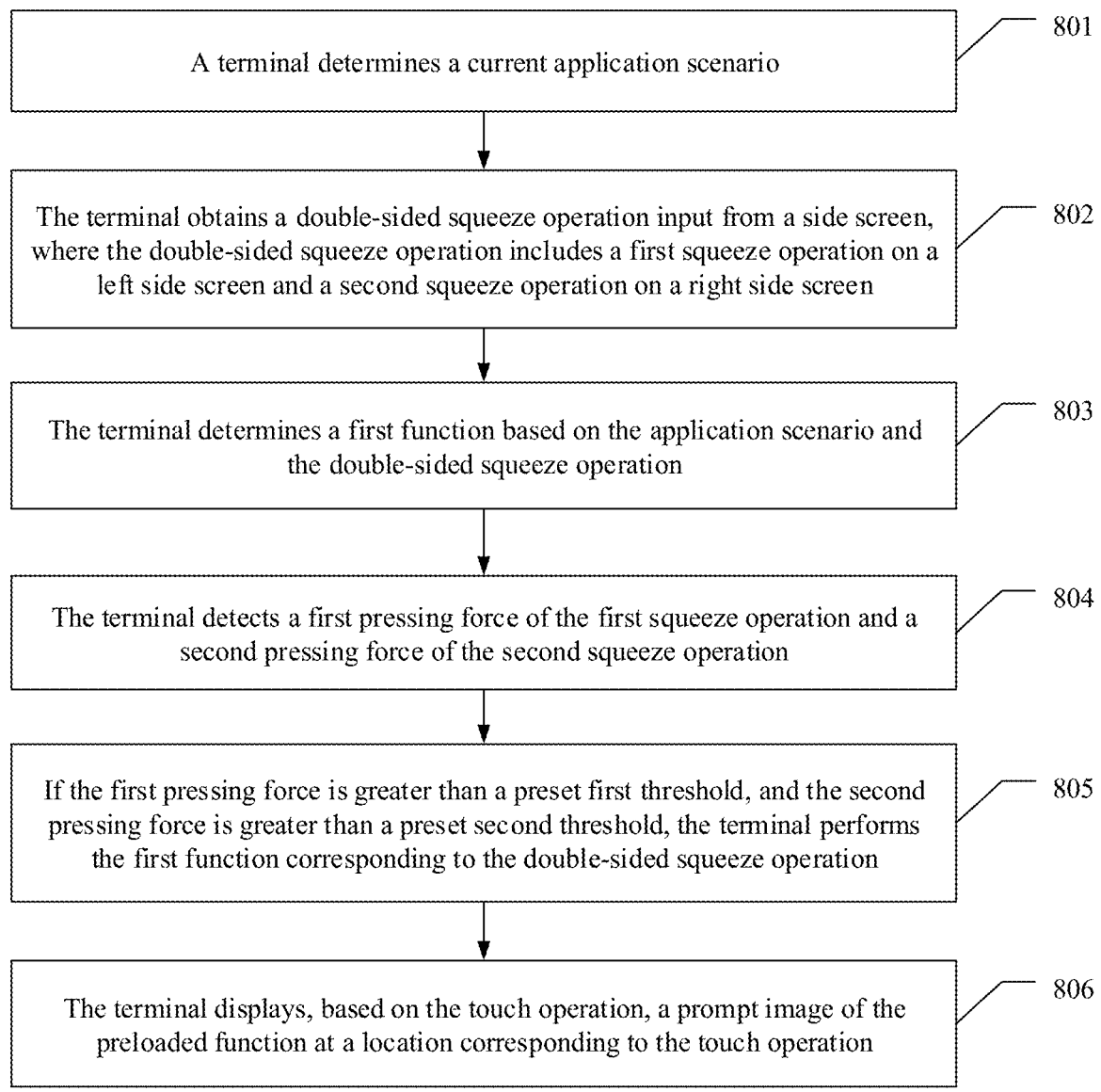
FIG. 8 is a schematic diagram of another embodiment of a gesture interaction method according to an embodiment of this application.

Based on the system architecture in FIG. 1, FIG. 8 is a schematic diagram of another embodiment of a gesture interaction method according to an embodiment of this application. This embodiment describes a gesture interaction method that is implemented by a terminal through a double-sided squeeze operation. The following steps are included.

801. The terminal determines a current application scenario.

Step 801 is similar to step 401 in the embodiment corresponding to FIG. 4 and is not repeated herein.

It should be noted that step 801 is an optional step, and may or may not be performed. This is not limited herein.

802. The terminal obtains a double-sided squeeze operation input from the side screen region.

In this embodiment, the curved screen configured on the terminal includes at least two side screen regions, optionally, including a left side screen region and a right side screen region. Similarly, if the curved screen configured on the terminal has a plurality of side screen regions, the double-sided squeeze operation may include any two of the plurality of side screen regions. The following is described by using an example in which the double-sided squeeze operation includes a first squeeze operation on a left side screen and a second squeeze operation on a right side screen. For example, when the user holds the terminal and performs the double-sided squeeze operation with the thumb and the index finger, a touch location at which the index finger performs a first squeeze operation may be a first location in the left side screen region, and a touch location at which the thumb performs a second squeeze operation may be a second location in the right side screen region.

Optionally, the terminal may further obtain information related to the double-sided squeeze operation, such as a touch location, touch duration, and a touch area. This is not specifically limited herein.

Figures 1, 9:
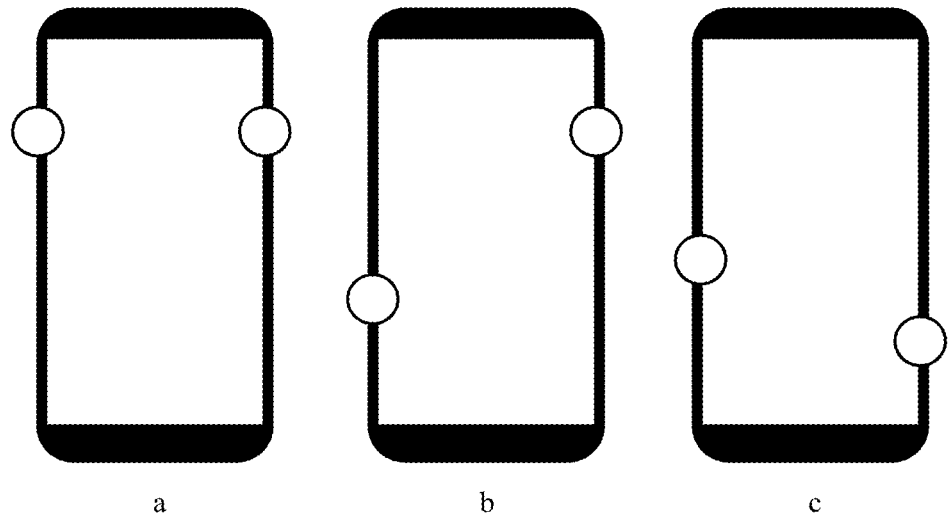
Figures 2, 9:
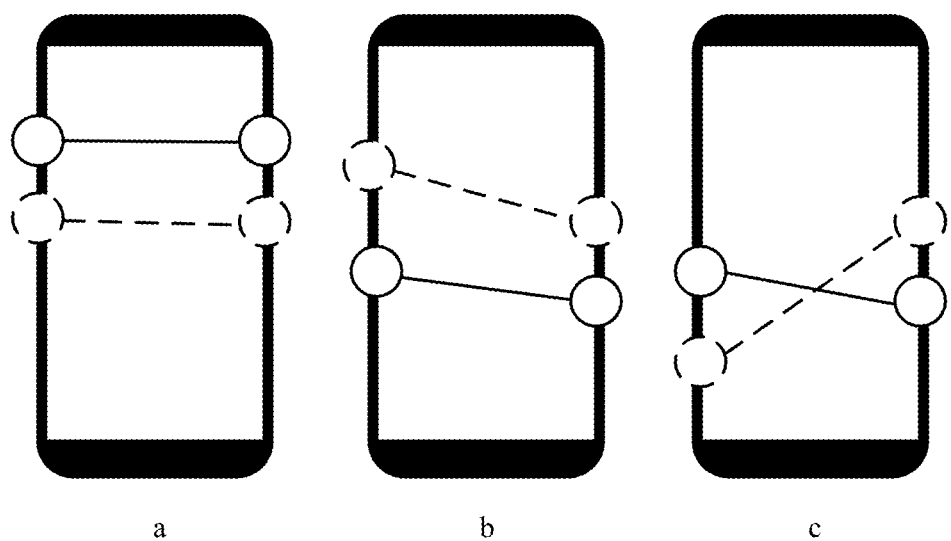

Optionally, a relationship between the locations of the first squeeze operation and the second squeeze operation is not limited. FIG. 9-1 is a schematic diagram of a double-sided squeeze operation, providing an example of specific locations of the first squeeze operation and the second squeeze operation of the double-sided squeeze operation.

As shown in FIG. 9-1, from observation in a laterally extending direction of the terminal, there are a plurality of possible pressing manners: a. The first location and the second location are on a same horizontal line; b. The first location is lower than the second location; c. The first location is higher than the second location.

Optionally, the terminal may obtain a plurality of double-sided squeeze operations input from the side screen region, and a quantity of double-sided squeezes is not limited. It can be understood that a time interval between input moments of any two consecutive operations of the plurality of double-sided squeeze operations should be less than a preset duration threshold. For example, for the first double-sided squeeze operation and the second double-sided squeeze operation, an input time interval between the second double-sided squeeze operation and the first double-sided squeeze operation is less than a first preset duration threshold.

In this embodiment, a relationship between press locations of the first double-sided squeeze operation and the second double-sided squeeze operation is not limited. FIG. 9-2 is a schematic diagram of a double-sided squeeze operation, providing an example of specific locations of the first squeeze operation and the second squeeze operation of the double-sided squeeze operation.

As shown in FIG. 9-2, from observation in a laterally extending direction of the terminal, there are a plurality of possible pressing manners: a. Locations of the first double-sided squeeze operation are higher than locations of the second double-sided squeeze operation; b. Locations of the first double-sided squeeze operation are lower than locations of the second double-sided squeeze operation; c. A first location of the first double-sided squeeze operation is higher than a first location of the second double-sided squeeze operation, and a second location of the first double-sided squeeze operation is lower than a second location of the second double-sided squeeze operation. It can be understood that only some implementations are shown in FIG. 9-2. In addition, the locations of the first double-sided squeeze operation may alternatively overlap with the locations of the second double-sided squeeze operation.

803. The terminal determines a first function based on the application scenario and the double-sided squeeze operation.

The terminal obtains double-sided squeeze input from the side screen region, and determines the corresponding first function through comparison with a predefined gesture in a system database.

The terminal determines the corresponding first function based on the application scenario obtained in step 801 and the double-sided squeeze operation obtained in step 802. Through comparison with the predefined gesture in the system database, the terminal determines the corresponding first function based on a correspondence between the application scenario and the double-sided squeeze operation, and the first function. The correspondence between the application scenario and the double-sided squeeze operation, and the first function may be a factory default setting of the terminal or a user-defined setting. This is not specifically limited herein. The correspondence between the application scenario and the double-sided squeeze operation, and the first function may be stored in the system database.

Optionally, the terminal may perform a plurality of double-sided squeeze operations, and a time interval between input moments of two consecutive double-sided squeeze operations of the plurality of double-sided squeeze operations should be less than a preset duration threshold. A specific value of the duration threshold is not limited herein, and may be, for example, 1 second. The terminal may determine a corresponding first function based on the application scenario and the plurality of double-sided squeeze operations.

For example, the terminal learns that the current application scenario is a camera application, and the terminal determines, based on a preset correspondence, that in the application scenario, a function corresponding to the double-sided squeeze operation is photo shooting, and a function corresponding to two consecutive double-sided squeeze operations is video shooting.

It should be noted that if step 801 is not performed, the terminal may determine the corresponding first function based on only the double-sided squeeze operation.

Optionally, the terminal may alternatively determine the corresponding first function based on a touch location of the double-sided squeeze operation.

For example, squeezing an upper part of a side screen two consecutive times corresponds to performing a screen recording operation; squeezing a lower part of the side screen once corresponds to awaking a voice assistant; squeezing a lower part of the side screen two consecutive times corresponds to awaking a payment function.

Optionally, the terminal determines the corresponding first function based on the application scenario and an operation type of the touch operation instead of a specific touch location. In this way, the touch operation of the user is relatively flexible, and operation difficulty for the user can be reduced.

804. The terminal detects a first pressing force of the first squeeze operation and a second pressing force of the second squeeze operation.

The detecting, by the terminal, the pressing force of the double-sided squeeze operation includes: detecting the first pressing force of the first squeeze operation and the second pressing force of the second squeeze operation. The terminal may detect the pressing force of the squeeze operation by using a pressure sensor or the like in the side screen region.

Optionally, the terminal may detect pressing forces of a first squeeze operation and a second squeeze operation of each double-sided squeeze operation of a plurality of consecutive double-sided squeeze operations.

It should be noted that an execution order of step 804 and step 803 is not limited. Step 803 may be performed before step 804, or step 804 may be performed before step 803.

805. If the first pressing force is greater than a preset first threshold, and the second pressing force is greater than a preset second threshold, the terminal performs the first function corresponding to the double-sided squeeze operation.

The first threshold is an empirical value determined based on a user habit in practical application, and is not specifically limited herein. Similarly, the second threshold is also used in this embodiment, and the second threshold is an empirical value determined based on a user habit in practical application. The distinction between "first" and "second" is only intended to represent thresholds corresponding to the two press operations. In actual application, physical values of the first threshold and the second threshold may be the same or different.

806. The terminal displays, based on the touch operation, a prompt image of the preloaded function at a location corresponding to the touch operation.

In the gesture interaction method provided in this embodiment, the first function is performed through the touch operation input from the side screen region, lacking a physical key or visual guidance of a control interface. For ease of determining, by the user, a specific function triggered by pressing the side screen, the prompt image may be displayed at the location corresponding to the touch operation to indicate, to the user, a function that may be triggered by the touch operation input from the side screen region.

Optionally, the location corresponding to the touch operation may be in the side screen region or the main screen region, or extend from the side screen region to the main screen region. This is not limited herein. Optionally, the location corresponding to the touch operation may extend from the location corresponding to the first squeeze operation to the location corresponding to the second squeeze operation. The location corresponding to the touch operation may alternatively be a midpoint between the locations of the first squeeze operation and the second squeeze operation in a direction parallel to a side direction of the terminal.

Optionally, the prompt image may be a text, an icon, a combination of a text and an icon, or the like, or the prompt image may include various forms of display effects or animations. Optionally, a size of the prompt image may be positively correlated with the pressing force of the touch operation.

It should be noted that step 806 is an optional step, and may or may not be performed. This is not limited herein.

Figure 10:
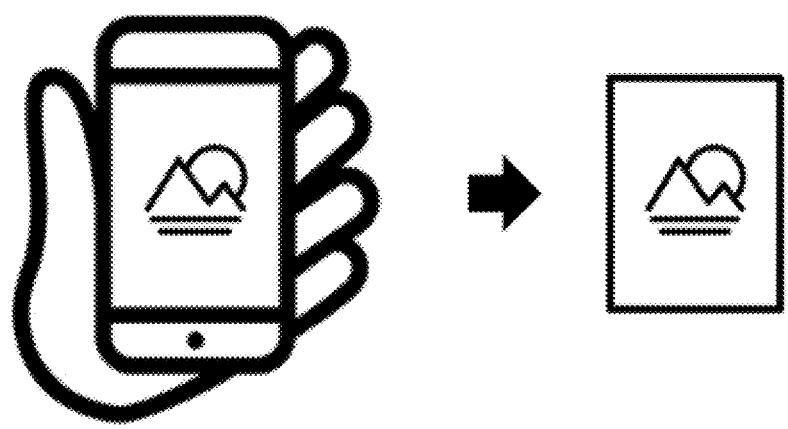
FIG. 10 is a schematic diagram of performing gesture interaction by a user through a side screen region of a terminal.

A camera application scenario is used as an example to below describe the gesture interaction method of this embodiment. FIG. 10 is a schematic diagram of performing gesture interaction by a user through a side screen region of a terminal.

In FIG. 10, the terminal learns that the current application scenario is a photo mode, and further obtains a double-sided squeeze operation input from the side screen region by the user. The double-sided squeeze operation in the camera mode corresponds to execution of a photo shooting function of a rear camera. During detection of the double-sided press operation, when a first pressing force of a first squeeze operation input in the left side screen region reaches the first threshold, and a second pressing force of the second squeeze operation input in the right side screen region reaches the second threshold, the terminal may perform the photo shooting function, to obtain a shot image. In addition, during the touch operation, the terminal may display a prompt image in the main screen region, to indicate, to the user, that the photo shooting function has been performed.

Figure 11:
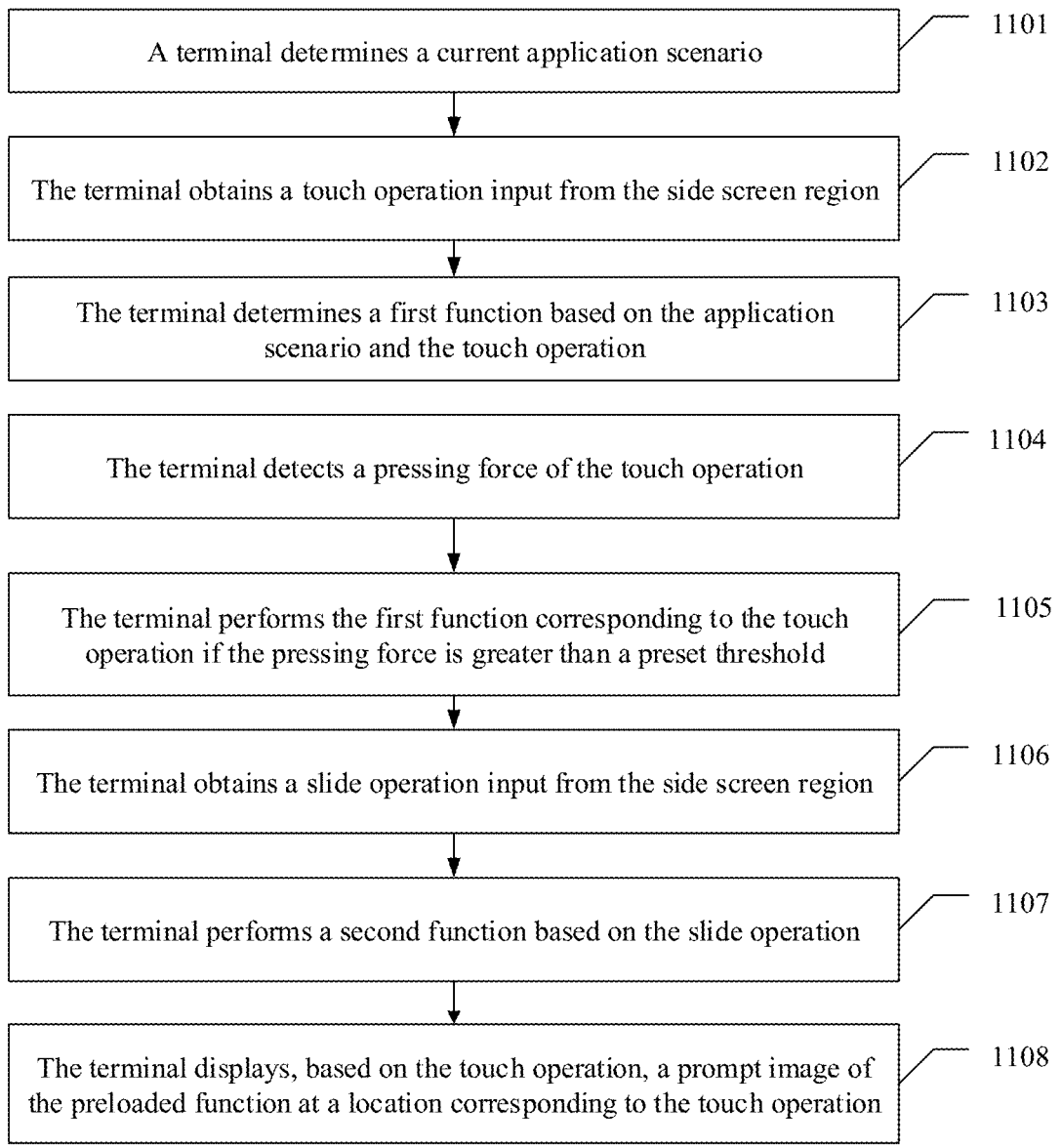
FIG. 11 is a schematic diagram of another embodiment of a gesture interaction method according to an embodiment of this application.

Based on the system architecture in FIG. 1, FIG. 11 is a schematic diagram of another embodiment of a gesture interaction method according to an embodiment of this application. This embodiment describes a gesture interaction method that is implemented by a terminal by obtaining a touch operation and a slide operation. The following steps are included.

1101. The terminal determines a current application scenario.

1102. The terminal obtains a touch operation input from the side screen region.

Steps 1101 and 1102 are similar to steps 401 and 402 in the embodiment corresponding to FIG. 4 and are not repeated herein.

It should be noted that step 1101 is an optional step, and may or may not be performed. This is not limited herein.

1103. The terminal determines a first function based on the application scenario and the touch operation.

The terminal determines the corresponding first function based on the application scenario obtained in step 1101 and the touch operation obtained in step 1102. A correspondence between the application scenario and the touch operation, and the first function may be a factory default setting of the terminal or a user-defined setting. This is not specifically limited herein. The correspondence between the application scenario and the touch operation, and the first function may be stored in a system database.

It should be noted that if step 1101 is not performed, the terminal may determine the corresponding first function based on only the double-sided squeeze operation. For example, the touch operation is a single-finger press input in a right side screen region, and the corresponding first function is a volume control function.

It should be noted that in this embodiment, the first function has a secondary adjustment sub-function. For example, the first function may be a volume control function, a screen brightness control function, or the like. The sub-function is used to adjust a magnitude of the first function.

1104. The terminal detects a pressing force of the touch operation.

Step 1104 is similar to step 404 in the embodiment corresponding to FIG. 4 and is not repeated herein.

It should be noted that an execution order of step 1104 and step 1103 is not limited. Step 1103 may be performed before step 1104, or step 1104 may be performed before step 1103.

1105. The terminal performs the first function corresponding to the touch operation if the pressing force is greater than a preset threshold.

The terminal performs the first function corresponding to the touch operation if the pressing force is greater than the preset threshold.

Optionally, the terminal may further determine whether the first function has a secondary adjustment sub-function. If yes, the terminal is triggered to check whether a slide operation is input in the side screen region.

1106. The terminal obtains a slide operation input from the side screen region.

After obtaining the touch operation, the terminal may further obtain the slide operation input from the side screen region.

It should be noted that step 1106 is performed after step 1102. An execution order of step 1106 and step 1103 to step 1105 is not limited. Step 1106 may be performed before any one of step 1103 to step 1105.

Optionally, after determining the first function corresponding to the touch operation, the terminal may determine whether the first function has a secondary adjustment sub-function. If the terminal determines that the first function has a secondary adjustment sub-function, the terminal checks whether a slide operation is input in the side screen region. The terminal continues to obtain the slide operation input from the side screen region. The slide operation is used to adjust a magnitude of the first function. For example, in a volume control function, a volume level may be further adjusted, including a volume increase and volume decrease; in a screen brightness control function, screen brightness may be further controlled to increase or decrease; in a camera beauty function, a skin beauty level may be further controlled to increase or decrease.

Optionally, after obtaining the touch operation in the side screen region, the terminal further obtains the slide operation input from the side screen region, and a time interval between input moments of the slide operation and the touch operation is less than preset duration. Optionally, a touch location of the touch operation is a start point of the slide operation.

Figure 12:
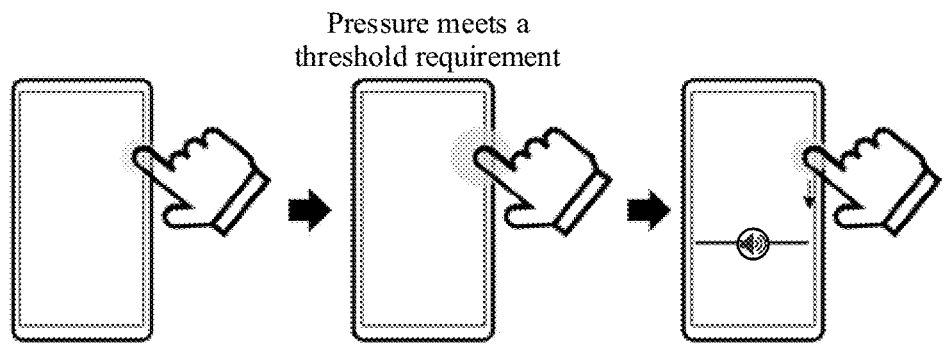
FIG. 12 is a schematic diagram of an embodiment of obtaining a slide operation by a terminal according to an embodiment of this application.

Optionally, FIG. 12 is a schematic diagram of an embodiment of obtaining a slide operation by a terminal according to an embodiment of this application.

The terminal obtains a touch operation, such as a single-finger press, input by the user from the side screen region, and detects that a pressing force meets a threshold requirement. A first function corresponding to the single-finger press operation is volume control. The terminal obtains a slide operation: sliding down, and a corresponding second function is a volume decrease.

Optionally, the slide operation includes a slide direction and a slide distance. A specific magnitude of secondary adjustment may be determined from the slide direction and the slide distance. For example, if the first function is a volume adjustment function, the sub-function of secondary adjustment is volume value adjustment. If the slide operation obtained by the terminal is sliding up, the corresponding sub-function is a volume increase, and if the slide operation obtained by the terminal is sliding down, the corresponding sub-function is a volume decrease. The slide distance is positively correlated with a degree of volume adjustment. Optionally, the slide distance corresponds to a volume value, and sliding up by one distance unit corresponds to a volume increase of 5 decibels. Alternatively, the slide distance corresponds to a volume percentage. For example, if maximum volume of the terminal is 100%, sliding down by one distance unit corresponds to a volume increase of 10%. A slide distance corresponding to one distance unit may be preset. For example, a distance unit is eight device independent pixels (device independent pixel, dip).

Figure 13:
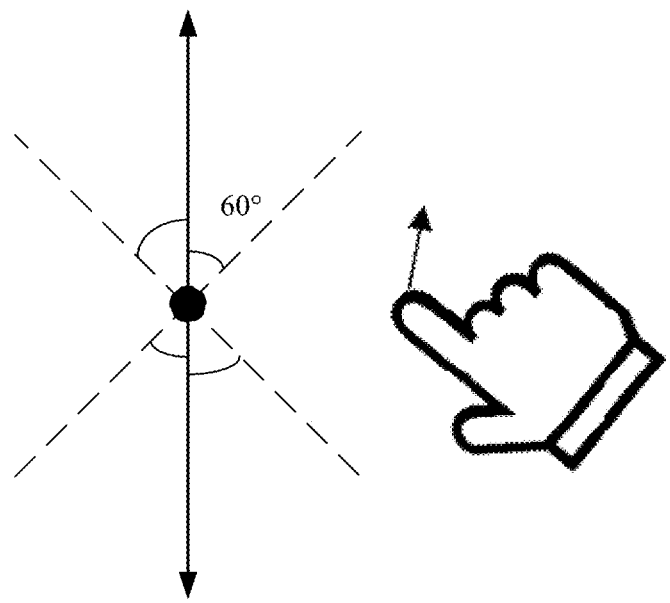
FIG. 13 is another schematic diagram of an embodiment of obtaining a slide operation by a terminal according to an embodiment of this application.

FIG. 13 is another schematic diagram of an embodiment of obtaining a slide operation by a terminal according to an embodiment of this application. When the slide direction is determined, a slide whose direction forms a specific included angle with a laterally extending upward direction of the terminal may be considered as sliding up. Optionally, a slide whose direction forms an included angle less than or equal to 60 degrees with a laterally extending upward direction of the terminal is determined as sliding up, and a slide whose direction forms an included angle less than or equal to 60 degrees with a laterally extending downward direction of the terminal is determined as slide down.

1107. The terminal performs a second function based on the slide operation.

The slide operation is used to adjust the magnitude of the first function. The terminal performs the second function based on the slide operation. For example, the second function includes volume increase or decrease adjustment, or screen brightness increase or decrease control, or skin beauty level increase or decrease control.

Figure 14:
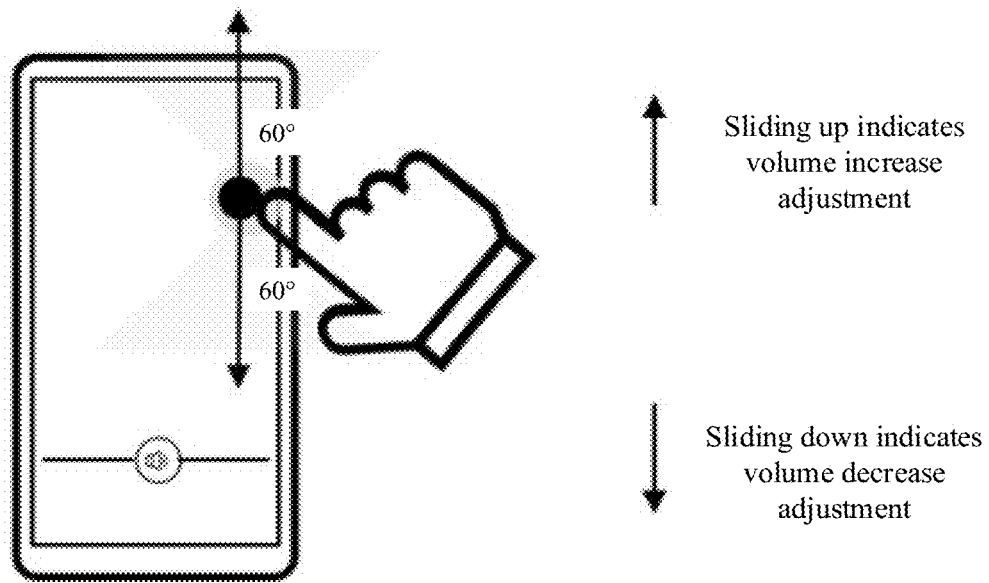
FIG. 14 is a schematic diagram of another embodiment of a gesture interaction method according to an embodiment of this application.
Figure 15:
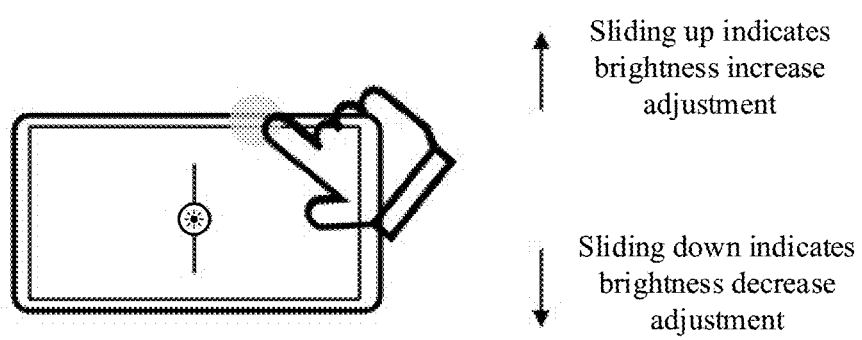
FIG. 15 is a schematic diagram of another embodiment of a gesture interaction method according to an embodiment of this application.

FIG. 14 and FIG. 15 are schematic diagrams of embodiments of a gesture interaction method according to embodiments of this application.

As shown in FIG. 14, if the user inputs a sliding up operation, volume increase adjustment is performed, and if the user inputs a sliding down operation, volume decrease adjustment is performed.

As shown in FIG. 15, if the user inputs a sliding up operation, brightness increase adjustment is performed, and if the user inputs a sliding down operation, brightness decrease adjustment is performed. It can be understood that when the terminal is in a landscape mode, sliding left corresponds to an increase in brightness, and sliding right corresponds to a decrease in brightness.

1108. The terminal displays, based on the touch operation, a prompt image of the preloaded function at a location corresponding to the touch operation.

Volume adjustment is used as an example below to describe how the prompt image is displayed.

Figure 16:
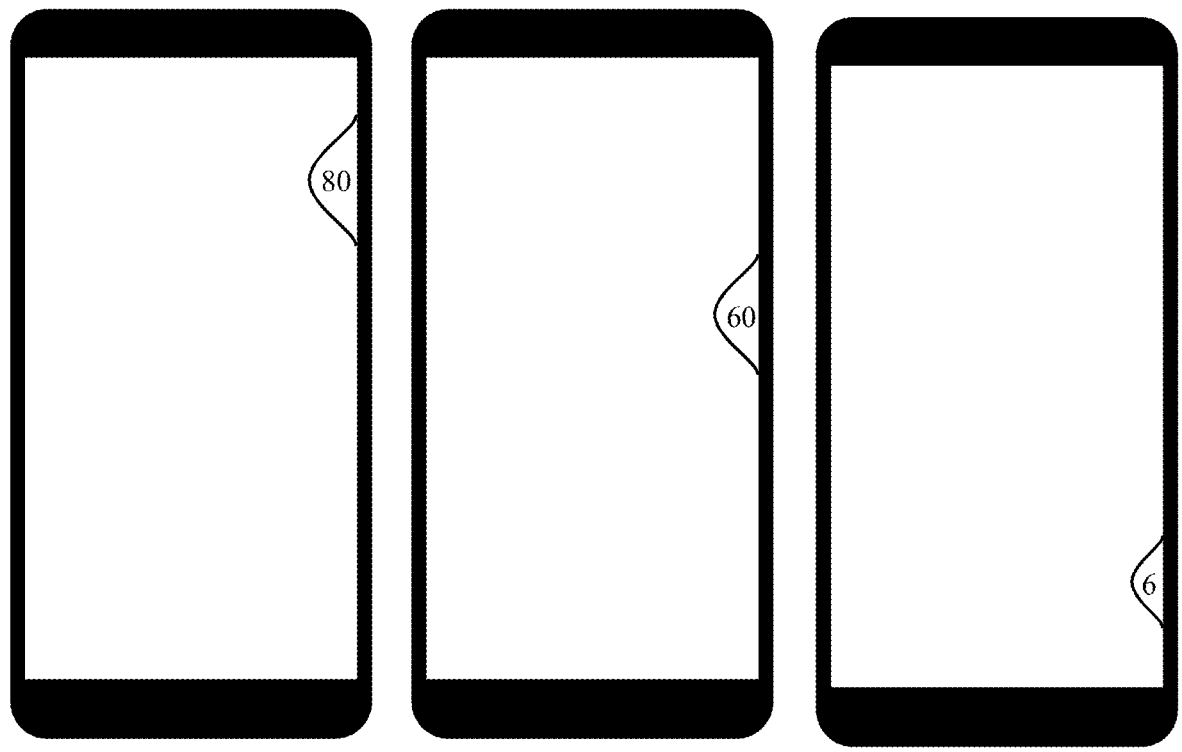
FIG. 16 is a schematic diagram of another embodiment of displaying a prompt image by a terminal.

FIG. 16 is a schematic diagram of another embodiment of displaying a prompt image by a terminal.

A visual prompt for volume adjustment is displayed at a screen location corresponding to a touch point, and moves with a location at which the user inputs the slide operation. Sliding down indicates a volume decrease. As shown in the figure, volume is decreased from 80 to 60, and finally to 6. When a finger moves away from a side screen, a size of the visual prompt gradually decreases until the visual prompt disappears. The size of the visual prompt is positively correlated with a volume value. For example, a size when the volume is 80 is larger than a size when the volume is 60.

Figure 17:
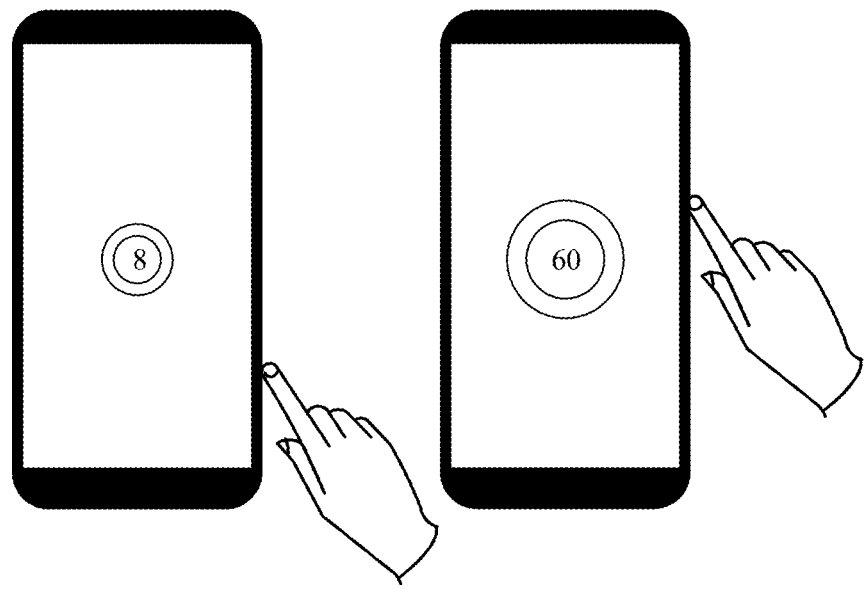
FIG. 17 is a schematic diagram of another embodiment of displaying a prompt image by a terminal.

FIG. 17 is a schematic diagram of another embodiment of displaying a prompt image by a terminal.

The visual prompt for volume adjustment is displayed in a preset location on the main screen region. When the user inputs the slide operation, sliding down indicates a volume decrease, and sliding up indicates a volume increase. The display location of the prompt image may be in the center of the main screen region. Optionally, the display location of the prompt image is fixed. Optionally, the size of the prompt image is positively correlated with the volume value. As shown in the figure, when the volume value is 8, the size of the prompt image size is relatively small. With input of a sliding up operation, the volume is increased to 6, and the size of the prompt image increases with the volume.

Figure 18:
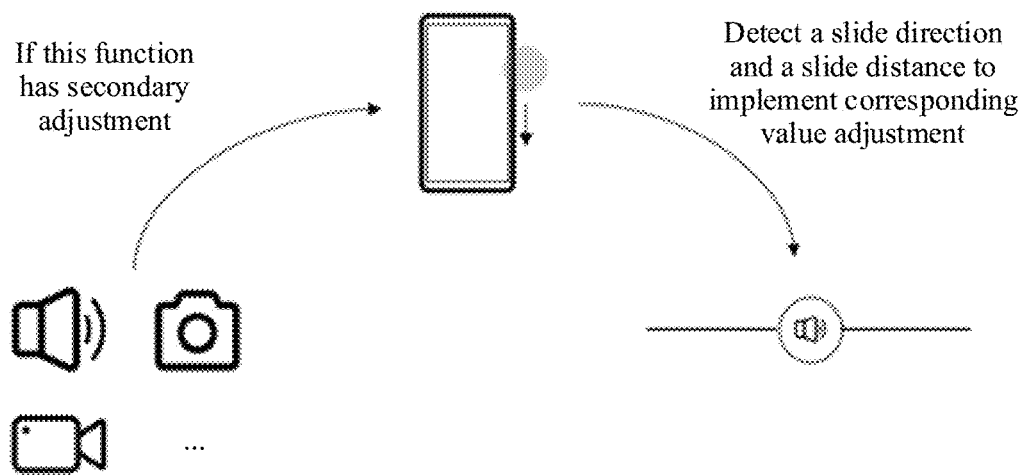
FIG. 18 is a schematic diagram of performing gesture interaction by a user through a side screen region of a terminal.

A volume adjustment function is used as an example below to describe the gesture interaction method of this embodiment. FIG. 18 is a schematic diagram of performing gesture interaction by a user through a side screen region of a terminal.

In FIG. 18, the first function corresponding to the touch operation obtained by the terminal is a volume control function with a secondary adjustment sub-function. The terminal checks whether there is a slide operation, and obtains the slide direction and the slide distance. After obtaining a sliding down operation, the terminal determines the corresponding second function is a volume decrease, and the terminal performs the second function.

Figure 19:
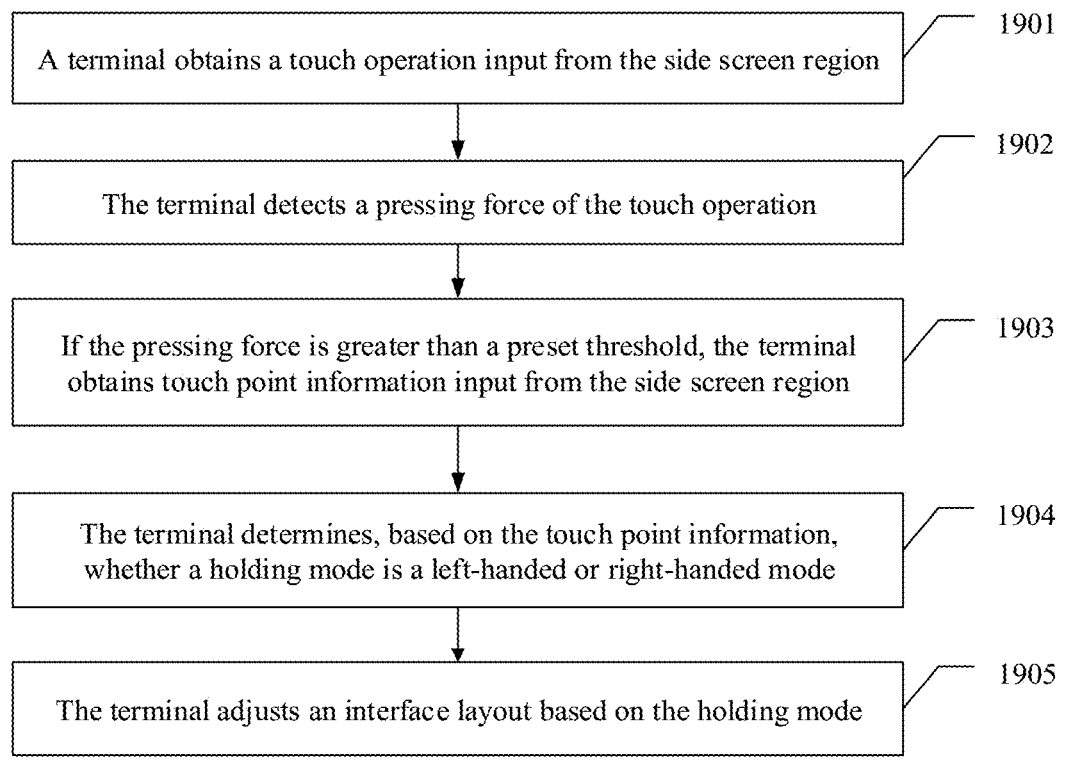
FIG. 19 is a schematic diagram of an embodiment of a gesture interaction method according to an embodiment of this application.

FIG. 19 is a schematic diagram of an embodiment of a gesture interaction method according to an embodiment of this application. This embodiment describes a method in which the terminal obtains a touch operation to determine a holding mode of the user. The following steps are included.

1901. The terminal obtains a touch operation input from the side screen region.

1902. The terminal detects a pressing force of the touch operation.

Steps 1901 and 1902 are similar to steps 401 and 404 in the embodiment corresponding to FIG. 4 and are not repeated herein.

It should be noted that steps 1901 and 1902 are optional steps, and may or may not be performed. This is not limited herein.

1903. If the pressing force is greater than a preset threshold, the terminal obtains touch point information input from the side screen region.

When holding the terminal, the user usually comes into contact with the side screen region of the terminal. The terminal may obtain the touch point information input from the side screen region. The side screen region includes a left side screen region and a right side screen region. To be specific, the terminal may obtain touch point information input from the left side screen region and touch point information input from the right side screen region.

Similarly, if the curved screen configured on the terminal has a plurality of side screen regions, each of the plurality of side screen regions, such as an upper side screen region or a lower side screen region may be used to obtain the touch point information. This is not limited herein.

Optionally, the touch point information may include a quantity of touch points or a touch point area.

It should be noted that if step 1901 and step 1902 are not performed, the terminal may directly obtain the touch point information input in the side screen region.

1904. The terminal determines, based on the touch point information, whether a holding mode is a left-handed mode or a right-handed mode.

There are many specific implementations for determining a holding mode by the terminal based on the touch point information. The touch point information includes a touch point quantity, a touch point location, a touch point area, or the like. This is not limited herein. Optionally, the terminal determines the holding mode of the user based on a quantity of touch points input from the left side screen region and the quantity of touch points input from the right side screen region. The terminal may alternatively determine the holding mode based on a touch point area of a touch point input from the left side screen region and the touch point area of the touch point input from the right side screen region. This is not limited herein.

Optionally, if more than one touch point is input from the left side screen region, the terminal determines that the holding mode is the right-handed mode; or if more than one touch point is input from the right side screen region, the terminal determines that the holding mode is the left-handed mode.

Optionally, if more than one touch point is input from the left side screen region and one touch point is input from the right side screen region, the terminal determines that the holding mode is the right-handed mode; or if more than one touch point is input from the right side screen region and one touch point is input from the left side screen region, the terminal determines that the holding mode is the left-handed mode.

Optionally, the touch point information includes a touch point area. The terminal obtains a touch point area of a first left touch point input from the left side screen region and a touch point area of a first right touch point input from the right side screen region; and if the touch point area of the first left touch point is greater than the touch point area of the first right touch point, the terminal determines that the holding mode is the left-handed mode; or if the touch point area of the first left touch point is less than the touch point area of the first right touch point, the terminal determines that the holding mode is the right-handed mode.

Figure 20:
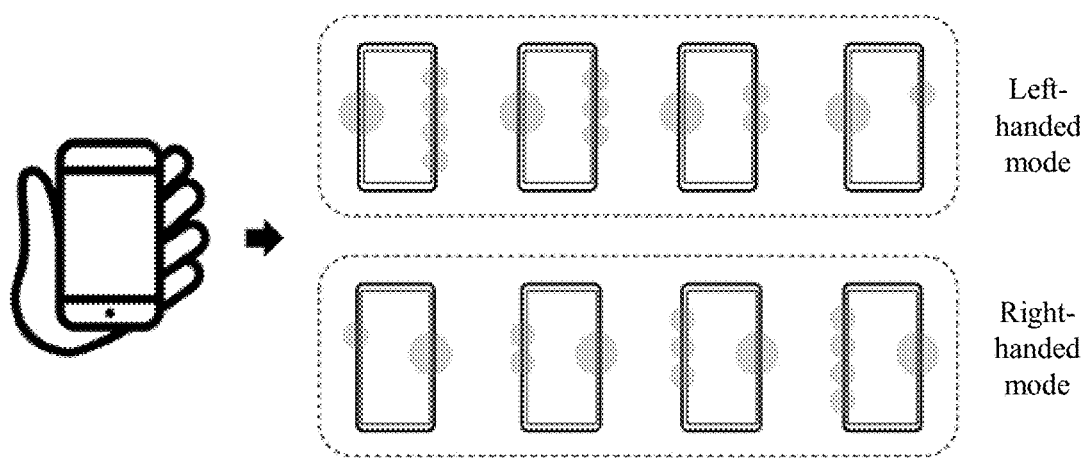
FIG. 20 is a schematic diagram of an embodiment of determining a holding mode by using touch point information by a terminal.

FIG. 20 is a schematic diagram of an embodiment of determining a holding mode by using touch point information by a terminal.

If one touch point is input in the left side screen region, but more than one touch point, for example, two, three, or four touch points, is input in the right side screen region, the holding mode is determined to be the left-handed mode; or if one touch point is input in the left side screen region, one touch point is also input in the right side screen region, and an area of a left touch point is greater than an area of a right touch point, the holding mode is determined to be the left-handed mode.

If one touch point is input in the right side screen region, but more than one touch point, for example, two, three, or four touch points, is input in the left side screen region, the holding mode is determined to be the right-handed mode; or if one touch point is input in the right side screen region, one touch point is also input in the left side screen region, and an area of a right touch point is greater than an area of a left touch point, the holding mode is determined to be the right-handed mode.

1905. The terminal adjusts an interface layout based on the holding mode.

Figure 21:
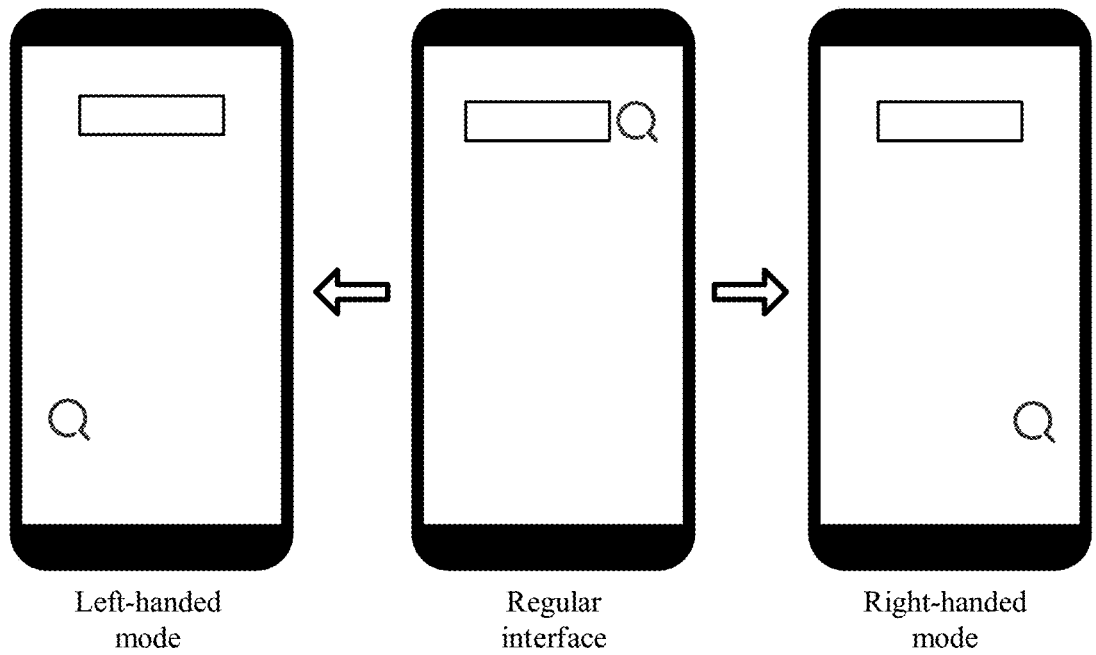
FIG. 21 is a schematic diagram of an embodiment of adjusting an interface layout by a terminal.
Figure 22:
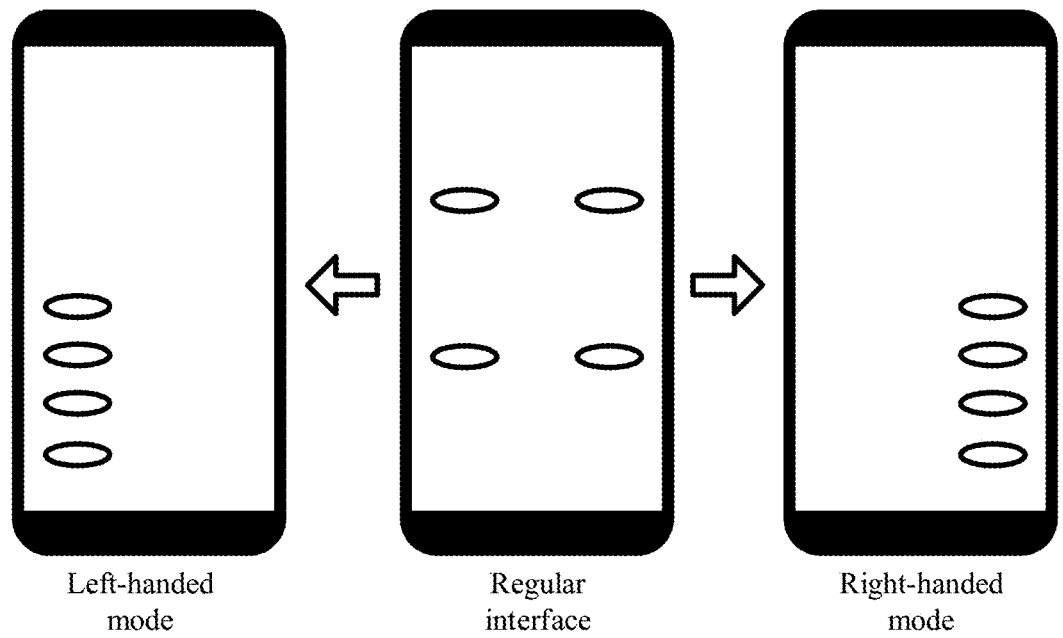
FIG. 22 is a schematic diagram of another embodiment of adjusting an interface layout by a terminal.

The terminal adjusts the interface layout based on the holding mode of the user determined in step 1904, to adjust an image area that triggers an operation on an interface to a side near a thumb of a holding hand, to facilitate a user operation. There are many ways to specifically adjust the interface layout. This is not limited herein. FIG. 21 and FIG. 22 are schematic diagrams of embodiments of adjusting an interface layout of a terminal, and describe two ways of adjusting the interface layout of the terminal based on a holding mode. For example, if the user holds the terminal with the right hand, the image area that triggers an operation on the interface is adjusted to a right side of the terminal. In doing so, when the user holds the terminal with the right hand, the user can touch, with the thumb of the right hand, the image area that triggers an operation on the interface.

Figure 23:
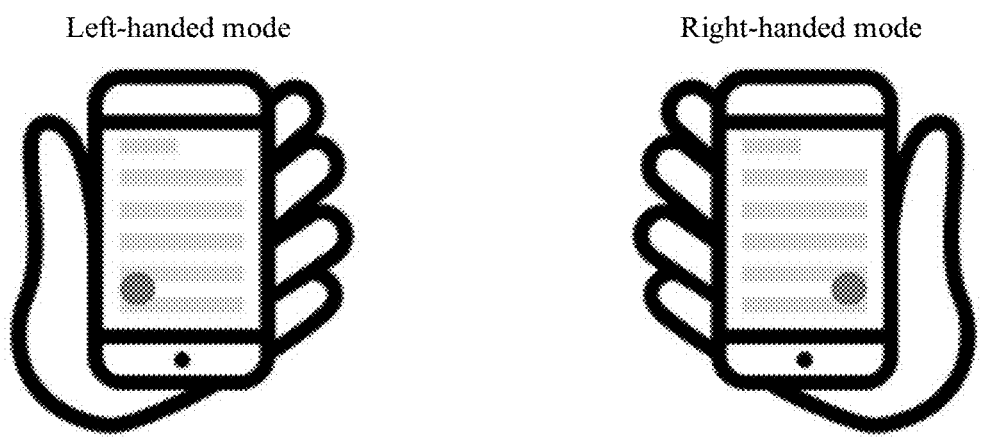
FIG. 23 is a schematic diagram of another embodiment of adjusting an interface layout by a terminal.

For example, FIG. 23 is a schematic diagram of an embodiment of adjusting an interface layout by a terminal.

A current application scenario of the terminal is mail sending. The terminal obtains touch point information input from the side screen region, and determines that one touch point is input in the left side screen region, and that four touch points are input in the right side screen region, and determines that the holding mode is the left-handed mode. Therefore, the terminal adjusts the interface layout and moves a mail sending icon to the left. Similarly, if the terminal determines that the holding mode of the user is the right-handed mode, a mail sending icon is moved to the right.

Figure 24:
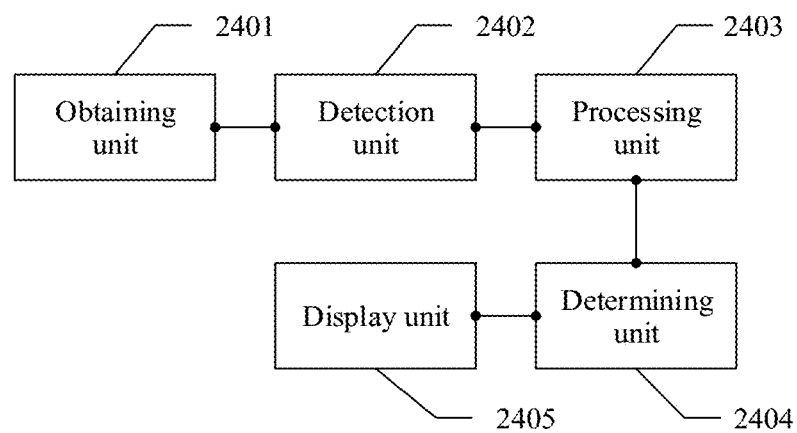
FIG. 24 is a schematic diagram of an embodiment of a terminal according to an embodiment of this application.

The foregoing describes the gesture interaction method provided in the embodiments of this application. The following describes a terminal that implements the method. FIG. 24 is a schematic diagram of an embodiment of a terminal according to an embodiment of this application.

The terminal provided in this embodiment of this application is configured with a curved screen. The curved screen includes a main screen region and a side screen region. The terminal includes:

an obtaining unit 2401, configured to obtain a touch operation input from the side screen region;

a detection unit 2402, configured to detect a pressing force of the touch operation; and a processing unit 2403, configured to perform a first function corresponding to the touch operation if the pressing force is greater than a preset threshold.

The terminal further includes:

a determining unit 2404, configured to determine a current application scenario.

The determining unit 2404 is further configured to determine the first function based on the application scenario and the touch operation.

The terminal further includes:

a display unit 2405, configured to display, based on the touch operation, a prompt image of the first function at a location corresponding to the touch operation.

The obtaining unit 2401 is specifically configured to:

obtain a first double-sided squeeze operation, where the first double-sided squeeze operation includes a first squeeze operation input from a left side screen region and a second squeeze operation input from a right side screen region.

The detection unit 2402 is specifically configured to:

detect a first pressing force of the first squeeze operation and a second pressing force of the second squeeze operation.

The processing unit 2403 is specifically configured to:

if the first pressing force is greater than a preset first threshold, and the second pressing force is greater than a preset second threshold, perform a first function corresponding to the double-sided squeeze operation.

The obtaining unit 2401 is further configured to:

obtain a second double-sided squeeze operation, where an input time interval between the second double-sided squeeze operation and the first double-sided squeeze operation is less than a first preset duration threshold.

The processing unit 2403 is specifically configured to:

if both a pressing force of the first double-sided squeeze operation and a pressing force of the second double-sided squeeze operation are greater than a preset third threshold, perform the first function corresponding to the first double-sided squeeze operation and the second double-sided squeeze operation.

The obtaining unit 2401 is further configured to:

obtain a slide operation input from the side screen region, where an input time interval between the slide operation and the touch operation is less than preset duration.

The processing unit 2403 is further configured to perform a second function based on the slide operation.

The display unit 2405 is further configured to:

display a prompt image of the second function at a location corresponding to the slide operation.

Figure 25:
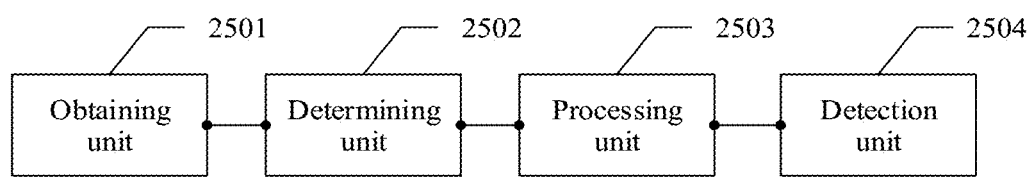
FIG. 25 is a schematic diagram of another embodiment of a terminal according to an embodiment of this application.

FIG. 25 is a schematic diagram of another embodiment of a terminal according to an embodiment of this application.

The terminal provided in this embodiment of this application is configured with a curved screen. The curved screen includes a main screen region and a side screen region. The terminal includes:

an obtaining unit 2501, configured to obtain touch point information input from the side screen region, where the side screen region includes a left side screen region and a right side screen region;

a determining unit 2502, configured to determine, based on the touch point information, whether a holding mode is a left-handed mode or a right-handed mode; and a processing unit 2503, configured to adjust an interface layout based on the holding mode.

The touch point information includes a quantity of touch points. The determining unit 2502 is specifically configured to: if more than one touch point is input from the left side screen region, determine that the holding mode is the right-handed mode; or if more than one touch point is input from the right side screen region, determine that the holding mode is the left-handed mode.

The determining unit 2502 is specifically configured to:

if more than one touch point is input from the left side screen region and one touch point is input from the right side screen region, determine that the holding mode is the right-handed mode; or if more than one touch point is input from the right side screen region and one touch point is input from the left side screen region, determine that the holding mode is the left-handed mode.

The touch point information includes a touch point area. The obtaining unit 2501 is further configured to:

obtain a touch point area of a first left touch point input from the left side screen region and a touch point area of a first right touch point input from the right side screen region. The determining unit 2502 is specifically configured to: if the touch point area of the first left touch point is greater than the touch point area of the first right touch point, determine that the holding mode is the left-handed mode; or if the touch point area of the first left touch point is less than the touch point area of the first right touch point, determine that the holding mode is the right-handed mode.

The obtaining unit 2501 is further configured to:

obtain a touch operation input from the side screen region. The terminal further includes a detection unit 2504, configured to detect a pressing force of the touch operation. The processing unit 2503 is further configured to: if the pressing force is greater than a preset threshold, trigger the terminal to obtain the touch point information input from the side screen region.

Figure 26:
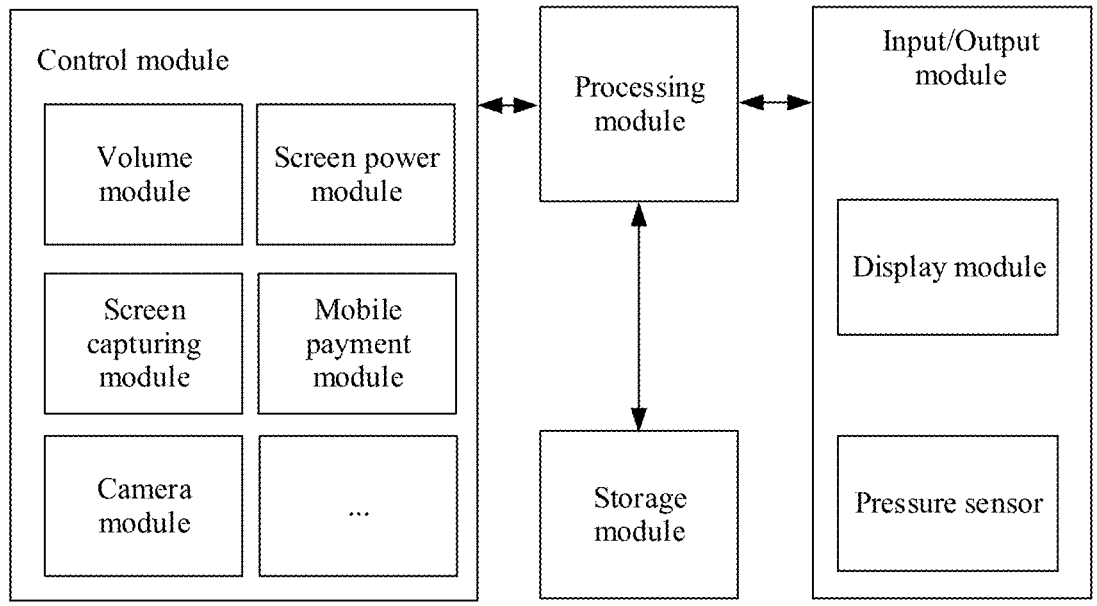
FIG. 26 is a schematic diagram of another embodiment of a terminal according to an embodiment of this application.

FIG. 26 is a schematic diagram of another embodiment of a terminal according to an embodiment of this application.

The terminal includes a processing module, a storage module, an input/output module, and a control module.

The input/output module is configured to enable, by using a touch sensor, a user to input related data through a touch operation, and is further configured to output a feedback to the user by using a screen, a loudspeaker, a vibrator, or the like. In this embodiment, functions of the input/output module and a display module are implemented by a touchscreen.

The input/output module specifically includes the display module and a pressure sensor module.

The display module is configured to display information interacted with the user. The pressure sensor may detect a pressing force of the touch operation. In this embodiment of this application, the pressure sensor is integrated into a side screen of the terminal. Different from a conventional pressure sensor on a front panel of a mobile phone, the pressure sensor on the side screen can monitor a specific pressure value for a system to determine a pressure threshold. There are two common pressure sensing touch technologies, one is implemented by using a chip technology. The other is implemented by using a pressure film technology. In the pressure film technology, pressure sensing can be implemented only by covering a pressure film on a cover plate, and a plurality of pressure points are supported. In this embodiment of this application, both the chip technology and the pressure film technology can meet a requirement of the gesture interaction method. Therefore, this is not limited herein.

The processing module is configured to: perform actions such as determining, analysis, and calculation, and send an instruction to another module.

The storage module is configured to store data. In this embodiment of this application, the storage module may be configured to store a correspondence between the touch operation and a function.

The control module is configured to receive an instruction of the processing module, to implement a function of the mobile phone. The control module includes a volume module, a screen power supply module, a screen capture module, a mobile payment module, a camera module, and the like. This is not specifically limited herein.

The volume module is configured to control volume of the mobile phone, which includes at least volume increase, volume decrease, continuous adjustment, and the like. The screen power supply module is configured to control a screen to be on/off, which includes at least turning the screen on/off, and the like. The screen capture module is configured to: record a screen and control capturing of the screen, which includes at least operations such as screen capture and screen recording. The mobile payment module is configured to control a payment function of the mobile phone, which includes at least operations such as payment and a payment code. The camera module is configured to perform camera control, which includes at least operations such as camera photographing and parameter adjustment.

Figure 27:
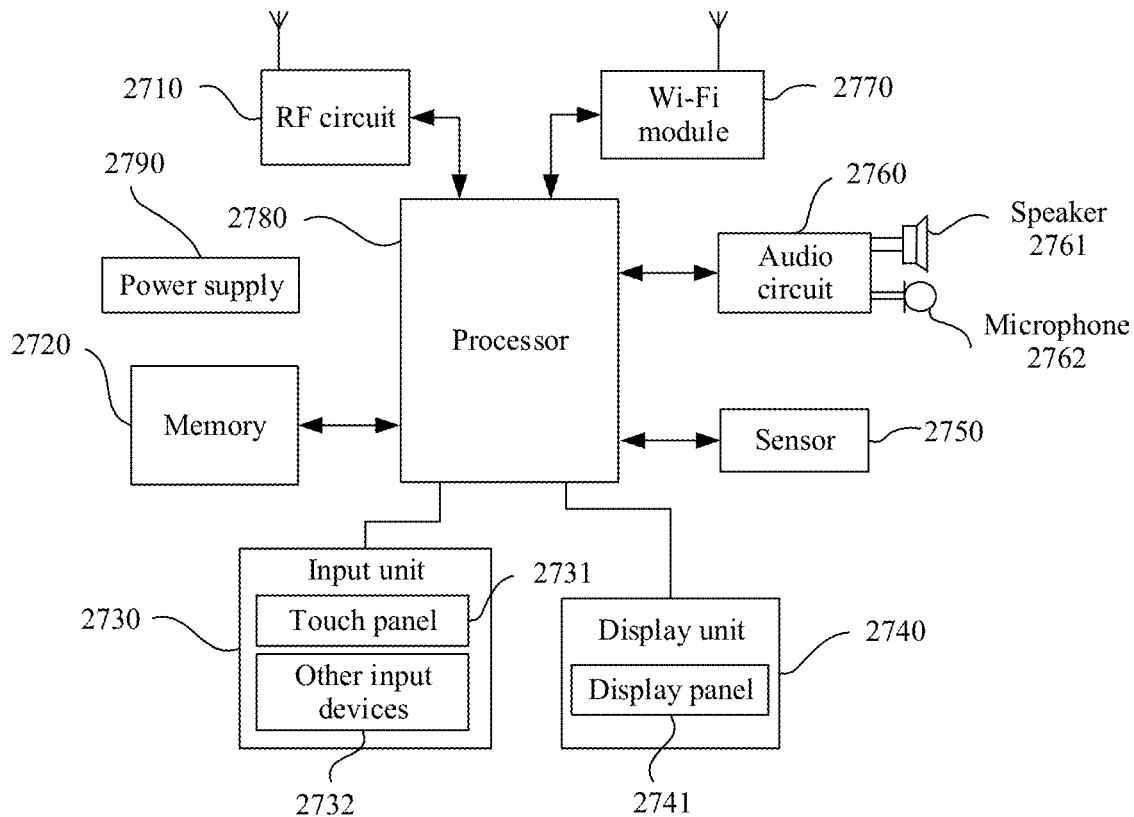
FIG. 27 is a schematic diagram of another embodiment of a terminal according to an embodiment of this application.

An embodiment of the present disclosure further provides another image display control apparatus, as shown in FIG. 27. For ease of description, only a part related to this embodiment of the present disclosure is illustrated. For specific technical details that are not disclosed, refer to the method part of the embodiments of the present disclosure. The terminal may be any terminal device including a mobile phone, a tablet computer, a personal digital assistant (personal digital assistant, PDA), a point of sales (point of sales, POS), a vehicle-mounted computer, or the like. For example, the terminal is a mobile phone.

FIG. 27 is a block diagram of a partial structure of a mobile phone related to a terminal according to an embodiment of the present disclosure. Refer to FIG. 27. The mobile phone includes components such as a radio frequency (RF) circuit 2710, a memory 2720, an input unit 2730, a display unit 2740, a sensor 2750, an audio circuit 2760, a wireless fidelity (Wi-Fi) module 2770, a processor 2780, and a power supply 2790. Persons skilled in the art may understand that a structure of the mobile phone shown in FIG. 27 does not constitute a limitation on the mobile phone, and the mobile phone may include more or fewer components than those shown in the figure, or combine some components, or have a different component arrangement.

The following describes each component of the mobile phone in detail with reference to FIG. 27.

The RF circuit 2710 may be configured to receive and send a signal in an information receiving and sending process or a call process. In particular, after receiving downlink information from a base station, the RF circuit 2710 sends the downlink information to the processor 2780 for processing. In addition, the RF circuit 2710 sends related uplink data to the base station. Generally, the RF circuit 2710 includes but is not limited to an antenna, at least one amplifier, a transceiver, a coupler, a low noise amplifier (LNA), a duplexer, and the like. In addition, the RF circuit 2710 may further communicate with a network and another device through wireless communication. Any communications standard or protocol may be used for the wireless communication, and includes but is not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 2720 may be configured to store a software program and a module. By running the software program and the module that are stored in the memory 2720, the processor 2780 performs various function applications of the mobile phone and data processing. The memory 2720 may mainly include a program storage area and a data storage area, where the program storage area may store an operating system, an application that is required by at least one function (such as a sound playing function or an image playing function), and the like. The data storage area may store data (such as audio data or an address book) that is created based on use of the mobile phone, and the like. In addition, the memory 2720 may include a high-speed random access memory, and may further include a nonvolatile memory, such as at least one magnetic disk storage component, a flash memory component, or another volatile solid-state storage component.

The input unit 2730 may be configured to: receive input digit or character information and generate a key signal input related to user settings and function control of the mobile phone. Specifically, the input unit 2730 may include a touch panel 2731 and another input device 2732. The touch panel 2731, also referred to as a touchscreen, may collect a touch operation performed by a user on or near the touch panel 2731 (for example, an operation performed by the user on or near the touch panel 2731 by using any proper object or accessory such as a finger or a stylus), and drive a corresponding connection apparatus based on a preset program. Optionally, the touch panel 2731 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 2780, and can receive and execute a command sent by the processor 2780. In addition, the touch panel 2731 may be implemented by using a plurality of types such as a resistive type, a capacitive type, an infrared ray type, and a surface acoustic wave type. The input unit 2730 may further include the another input device 2732 in addition to the touch panel 2731. Specifically, the another input device 2732 may include but is not limited to one or more of a physical keyboard, a function key (such as a volume control key or an on/off key), a trackball, a mouse, a joystick, and the like.

The display unit 2740 may be configured to display information entered by the user or information provided for the user, and various menus of the mobile phone. The display screen 2740 may include a display panel 2741. Optionally, the display panel 2741 may be configured in a form of a liquid crystal display (LCD), an organic light-emitting diode (OLED), or the like. Further, the touch panel 2731 may cover the display panel 2741. After detecting the touch operation on or near the touch panel 2731, the touch panel 2731 transmits the touch operation to the processor 2780 to determine a type of a touch event, and then the processor 2780 provides a corresponding visual output on the display panel 2741 based on the type of the touch event. In FIG. 27, the touch panel 2731 and the display panel 2741 are used as two independent components to implement input and output functions of the mobile phone. However, in some embodiments, the touch panel 2731 and the display panel 2741 may be integrated to implement the input and output functions of the mobile phone.

The mobile phone may further include at least one sensor 2750, such as an optical sensor, a movement sensor, or another sensor. Specifically, the optical sensor may include an ambient light sensor and a proximity sensor. The ambient light sensor may adjust luminance of the display panel 2741 based on brightness of ambient light, and the proximity sensor may disable the display panel 2741 and/or backlight when the mobile phone approaches an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The audio circuit 2760, a loudspeaker 2761, and a microphone 2762 may provide an audio interface between the user and the mobile phone. The audio circuit 2760 may transmit, to the loudspeaker 2761, an electrical signal obtained by converting received audio data, and the loudspeaker 2761 converts the electrical signal into a sound signal for output. In addition, the microphone 2762 converts a collected sound signal into an electrical signal, the audio circuit 2760 receives the electrical signal, converts the electrical signal into audio data, and then outputs the audio data to the processor 2780 for processing, and then the audio data is sent to, for example, another mobile phone, or the audio data is output to the memory 2720 for further processing.

Wi-Fi belongs to a short-distance wireless transmission technology. The mobile phone may help, by using the Wi-Fi module 2770, the user send and receive an email, browse a web page, access streaming media, and the like. The Wi-Fi module 2770 provides wireless access to a broadband internet for the user. Although FIG. 27 shows the Wi-Fi module 2770, it may be understood that the Wi-Fi module 2770 is not a mandatory component of the mobile phone, and may be definitely omitted based on a requirement without changing the essence of the present disclosure.

The processor 2780 is a control center of the entire mobile phone, is connected to each component of the entire mobile phone through various interfaces and lines, and performs various functions of the mobile phone and data processing by running or executing the software program and/or the module stored in the memory 2720 and by invoking data stored in the memory 2720, to perform overall monitoring on the mobile phone. Optionally, the processor 2780 may include one or more processing units. An application processor and a modem processor may be integrated into the processor 2780. The application processor mainly processes an operating system, a user interface, an application, and the like, and the modem processor mainly processes wireless communication. It may be understood that the foregoing modem processor may alternatively not be integrated into the processor 2780.

The mobile phone further includes the power supply 2790 (such as a battery) that supplies power to the components. Preferably, the power supply may be logically connected to the processor 2780 by using a power management system, so that functions such as charging, discharging, and power consumption management are implemented by using the power management system.

Although not shown, the mobile phone may further include a camera, a Bluetooth module, and the like. Details are not described herein.

In this embodiment of the present disclosure, the processor 2780 included in the terminal further has a function of implementing the foregoing gesture interaction methods.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A gesture interaction method, applied to a terminal configured with a curved screen, wherein the curved screen comprises a main screen region and a side screen region, and the method comprises:
    obtaining, by the terminal, a touch operation input from the side screen region;
    detecting, by the terminal, a pressing force of the touch operation; and
performing, by the terminal, a first function corresponding to the touch operation if the pressing force is greater than a preset threshold, wherein the obtaining, by the terminal, a touch operation input from the side screen region comprises:
    obtaining, by the terminal, a first double-sided squeeze operation, wherein the first double-sided squeeze operation comprises a first squeeze operation input from a left side screen region and a second squeeze operation input from a right side screen region and
    the detecting, by the terminal, a pressing force of the touch operation comprises:
    detecting, by the terminal, a first pressing force of the first squeeze operation and a second pressing force of the second squeeze operation; and
    the performing, by the terminal, a first function corresponding to the touch operation if the pressing force is greater than a preset threshold comprises:
    when the first pressing force is greater than a preset first threshold, and the second pressing force is greater than a preset second threshold, performing, by the terminal, a first function corresponding to the double-sided squeeze operation.

2. The method according to claim 1, wherein the method further comprises:
    determining, by the terminal, a current application scenario; and
    determining, by the terminal, the first function based on the application scenario and the touch operation.

3. The method according to claim 1, wherein the method further comprises:
    displaying, by the terminal based on the touch operation, a prompt image of the first function at a location corresponding to the touch operation.

4. The method according to claim 3, wherein the location corresponding to the touch operation is in the main screen region.

5. The method according to claim 3, wherein a size of the prompt image is positively correlated with the pressing force.

6. The method according to claim 1, wherein the method further comprises:
   obtaining, by the terminal, a second double-sided squeeze operation, wherein an input time interval between the second double-sided squeeze operation and the first double-sided squeeze operation is less than a first preset duration threshold; and
   the performing, by the terminal, a first function corresponding to the touch operation if the pressing force is greater than a preset threshold comprises:
   when both a pressing force of the first double-sided squeeze operation and a pressing force of the second double-sided squeeze operation are greater than a preset third threshold, performing, by the terminal, the first function corresponding to the first double-sided squeeze operation and the second double-sided squeeze operation.

7. The method according to claim 1, wherein the method further comprises:
   obtaining, by the terminal, a slide operation input from the side screen region, wherein an input time interval between the slide operation and the touch operation is less than preset duration; and
   performing, by the terminal, a second function based on the slide operation.

8. The method according to claim 7, wherein the second function is a sub-function of the first function, and the second function is used to adjust a magnitude of the first function.

9. The method according to claim 8, wherein the method further comprises:
   displaying, by the terminal, a prompt image of the second function at a location corresponding to the slide operation.

10. The method according to claim 9, wherein the location corresponding to the slide operation is in the main screen region.

11. The method according to claim 9, wherein a size of the prompt image is positively correlated with the magnitude.

12. A gesture interaction method, applied to a terminal configured with a curved screen, wherein the curved screen comprises a main screen region and a side screen region, and the method comprises:
   obtaining, by the terminal, touch point information input from the side screen region, wherein the side screen region comprises a left side screen region and a right side screen region;
   determining, by the terminal based on the touch point information, whether a holding mode is a left-handed mode or a right-handed mode; and
   adjusting, by the terminal, an interface layout based on the holding mode, wherein the obtaining, by the terminal, a touch operation input from the side screen region comprises:
   obtaining, by the terminal, a first double-sided squeeze operation, wherein the first double-sided squeeze operation comprises a first squeeze operation input from a left side screen region and a second squeeze operation input from a right side screen region; and
   detecting, by the terminal, a first pressing force of the first squeeze operation and a second pressing force of the second squeeze operation; and
   when the first pressing force is greater than a preset first threshold, and the second pressing force is greater than a preset second threshold, performing, by the terminal, a first function corresponding to the double-sided squeeze operation.

13. The method according to claim 12, wherein the touch point information comprises a quantity of touch points; and
   the determining, by the terminal based on the touch point information, whether a holding mode is a left-handed mode or a right-handed mode comprises:
   when more than one touch point is input from the left side screen region, determining, by the terminal, that the holding mode is the right-handed mode; or
   when more than one touch point is input from the right side screen region, determining, by the terminal, that the holding mode is the left-handed mode.

14. The method according to claim 13, wherein the determining, by the terminal, that the holding mode is the right-handed mode comprises:
   when more than one touch point is input from the left side screen region and one touch point is input from the right side screen region, determining, by the terminal, that the holding mode is the right-handed mode; and
   the determining, by the terminal, that the holding mode is the left-handed mode comprises:
   when more than one touch point is input from the right side screen region and one touch point is input from the left side screen region, determining, by the terminal, that the holding mode is the left-handed mode.

15. The method according to claim 12, wherein the touch point information comprises a touch point area; and
   the method further comprises:
   obtaining, by the terminal, a touch point area of a first left touch point input from the left side screen region and a touch point area of a first right touch point input from the right side screen region; and
   when the touch point area of the first left touch point is greater than the touch point area of the first right touch point, determining, by the terminal, that the holding mode is the left-handed mode; or
   when the touch point area of the first left touch point is less than the touch point area of the first right touch point, determining, by the terminal, that the holding mode is the right-handed mode.

16. The method according to claim 12, wherein the method further comprises:
   obtaining, by the terminal, a touch operation input from the side screen region;
   detecting, by the terminal, a pressing force of the touch operation; and
   when the pressing force is greater than a preset threshold, triggering the terminal to obtain the touch point information input from the side screen region.

17. A terminal, comprising a processor and a non-transitory memory, wherein
   the non-transitory memory is configured to store instructions; and
   the processor is configured to execute the instructions to perform steps comprising:
   obtaining, by the terminal, a touch operation input from the side screen region;
   detecting, by the terminal, a pressing force of the touch operation; and
   performing, by the terminal, a first function corresponding to the touch operation if the pressing force is greater than a preset threshold, wherein the obtaining, by the terminal, a touch operation input from the side screen region comprises:

obtaining, by the terminal, a first double-sided squeeze operation, wherein the first double-sided squeeze operation comprises a first squeeze operation input from a left side screen region and a second squeeze operation input from a right side screen region and the detecting, by the terminal, a pressing force of the touch operation comprises:

detecting, by the terminal, a first pressing force of the first squeeze operation and a second pressing force of the second squeeze operation; and the performing, by the terminal, a first function corresponding to the touch operation if the pressing force is greater than a preset threshold comprises:

when the first pressing force is greater than a preset first threshold, and the second pressing force is greater than a preset second threshold, performing, by the terminal, a first function corresponding to the double-sided squeeze operation.

18. A computer program product comprising instructions, wherein when the computer program product runs on a computer, the computer executes steps comprising:

obtaining, by the terminal, a touch operation input from the side screen region;

detecting, by the terminal, a pressing force of the touch operation; and performing, by the terminal, a first function corresponding to the touch operation when the pressing force is greater than a preset threshold, wherein the obtaining, by the terminal, a touch operation input from the side screen region comprises:

obtaining, by the terminal, a first double-sided squeeze operation, wherein the first double-sided squeeze operation comprises a first squeeze operation input from a left side screen region and a second squeeze operation input from a right side screen region and the detecting, by the terminal, a pressing force of the touch operation comprises:

detecting, by the terminal, a first pressing force of the first squeeze operation and a second pressing force of the second squeeze operation; and the performing, by the terminal, a first function corresponding to the touch operation if the pressing force is greater than a preset threshold comprises:

when the first pressing force is greater than a preset first threshold, and the second pressing force is greater than a preset second threshold, performing, by the terminal, a first function corresponding to the double-sided squeeze operation.

\* \* \* \* \*